(12) United States Patent
Ikeda

(10) Patent No.: US 9,299,000 B2
(45) Date of Patent: Mar. 29, 2016

(54) OBJECT REGION EXTRACTION SYSTEM, METHOD AND PROGRAM

(75) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 558 days.

(21) Appl. No.: 13/806,400

(22) PCT Filed: Jun. 16, 2011

(86) PCT No.: PCT/JP2011/064321
§ 371 (c)(1),
(2), (4) Date: Dec. 21, 2012

(87) PCT Pub. No.: WO2011/162309
PCT Pub. Date: Dec. 29, 2011

(65) Prior Publication Data
US 2013/0100252 A1    Apr. 25, 2013

(30) Foreign Application Priority Data

Jun. 23, 2010   (JP) ................................. 2010-142205

(51) Int. Cl.
*G06K 9/46* (2006.01)
*G06T 7/00* (2006.01)
*H04N 13/02* (2006.01)

(52) U.S. Cl.
CPC ................ *G06K 9/46* (2013.01); *G06T 7/0081* (2013.01); *H04N 13/02* (2013.01)

(58) Field of Classification Search
None
See application file for complete search history.

(56) References Cited

U.S. PATENT DOCUMENTS

| 4,575,304 A * | 3/1986 | Nakagawa et al. ............ 414/730 |
| 5,640,468 A * | 6/1997 | Hsu ................................ 382/190 |
| 6,404,920 B1 * | 6/2002 | Hsu ................................ 382/190 |
| 6,529,630 B1 * | 3/2003 | Kinjo ............................. 382/190 |
| 7,477,768 B2 * | 1/2009 | Kaufman et al. ............. 382/128 |
| 2008/0205717 A1 * | 8/2008 | Reeves et al. ................. 382/128 |
| 2009/0074272 A1 * | 3/2009 | Lu et al. ......................... 382/128 |

FOREIGN PATENT DOCUMENTS

| JP | 2004-46464 A | 2/2004 | |
| JP | 2004-046464 | * 12/2004 | ................ G06T 1/00 |
| JP | 2008-15573 A | 1/2008 | |
| JP | 2008-176504 A | 7/2008 | |
| JP | 2010-86237 A | 4/2010 | |

* cited by examiner

*Primary Examiner* — Jay Patel
*Assistant Examiner* — Reza Aghevli
(74) *Attorney, Agent, or Firm* — Sughrue Mion, PLLC

(57) ABSTRACT

An object region extraction system, an object region extraction method, and an object region extraction program, including an effectiveness evaluation quantity acquisition unit to acquire an evaluation quantity which increases or decreases when an angle formed by two back projections selected from back projections of one point of an object approach a right angle, wherein the back projections cross each other at a position in three-dimensional space and obtained from respective images, which include the one point and captured by respective m-number of image acquisition units, where m is greater than one, and an object region determination unit to, when the evaluation quantity is equal to or larger than or equal to or smaller than a predetermined value, determine the position to be a region occupied by the object, and output the determination result.

7 Claims, 19 Drawing Sheets

US 9,299,000 B2

OBJECT REGION EXTRACTION SYSTEM, METHOD AND PROGRAM

CROSS REFERENCE TO RELATED APPLICATIONS

This application is a National Stage of International Application No. PCT/JP2011/064321filed Jun. 16, 2011, claiming priority based on Japanese Patent Application No. 2010-142205 filed Jun. 23, 2010, the contents of all of which are incorporated herein by reference in their entirety.

TECHNICAL FIELD

The present invention relates to an object region extraction system, an object region extraction method and an object region extraction program.

BACKGROUND ART

An object region extraction system is used for finding an object region in three-dimensional space which becomes a key for estimating where on a map the object exists. An example of such an object region extraction system is described in Patent Document 1.

An image processing system described in Patent Document 1 comprises: a region extraction unit which, from a first to an n-th images (n: integer equal to or larger than two) obtained by capturing a real space, extracts a first to an n-th regions within the respective images each indicating an object in three-dimensional space; a coordinate transformation unit which, using first to n-th coordinate transformation information for transforming the above-mentioned first to n-th images into a specified planar coordinate system in the above-mentioned real space, transforms the first to n-th regions into respective regions in the above-mentioned planar coordinate system; an overlap detection unit which detects an overlap between a plurality of regions in the above-mentioned planar coordinate system obtained by the above-mentioned coordinate transformation unit; and a determination unit which determines, on the basis of the detection result by the above-mentioned overlap detection unit, existence of an object region in three-dimensional space in a specified plane within the above-mentioned real space.

CITATION LIST

Patent Document

[Patent Document 1] Japanese Patent Application Laid-Open No. 2008-15573

SUMMARY OF INVENTION

Technical Problem

The technology described in Patent Document 1 has a problem in that, in extracting a moving object region by each camera, when mis-extraction (the situation where extraction is impossible by mistake) occurs in any one of all of the cameras, an object region in three-dimensional space cannot be extracted (non-extraction), and thus an object position on a map cannot be estimated (refer to FIG. 1).

It is because the technology carries out the extraction under a severe restrictive condition such that, with respect to back projections of moving object regions extracted by the respective cameras, a region where all of the back projections overlap with each other (AND region) is determined to be an object region in three-dimensional space.

In this respect, it is supposed that this restrictive condition is changed to such that a three-dimensional space whose back projections are obtained from a large number of cameras (assumed as two or more cameras, here) among all of the cameras is extracted as an object region in three-dimensional space. In this case, as shown in FIG. 2, non-extraction of an object region seems to be eliminated. However, in a situation where a moving object region is normally extracted by all cameras, when the object moves to a position with respect which two cameras face each other or are in parallel (refer to FIG. 3), because of the relative positional relationships between the object and the cameras, an incorrect region including the object region is extracted as shown in FIG. 4. As a result, the object region extraction system cannot estimate the object position correctly. That is, the problem cannot be solved by only relaxing the restrictive condition.

In this respect, the objective of the present invention is to provide an object region extraction system, an object region extraction method and an object region extraction program which can improve non-extraction of an object region in three-dimensional space arising from mis-extraction of a moving object region (object region) from a camera image, and can also reduce incorrect extraction of an object region in three-dimensional space.

Solution to Problem

In order to achieve the objective, one aspect of the present invention is an object region extraction system which comprises: an effectiveness evaluation quantity acquisition means for acquiring an evaluation quantity which increases (or decreases) with the coming closer to a right angle of an angle made by two back projections selected from back projections of one point of an object, wherein said back projections are crossing each other at a position in three-dimensional space and obtained from respective images, which are including said one point and captured by respective ones of m-number of image acquisition means (m: a plural number); and an object region determination means for, when the aforementioned evaluation quantity is equal to or larger than (or, equal to or smaller than) a predetermined value, determines the aforementioned position to be a region occupied by the aforementioned object, and outputs the determination result.

Further, according to the present invention, provided is an object region extraction program for causing a computer to execute: an effectiveness evaluation quantity acquisition step of acquiring an evaluation quantity which increases (or decreases) with the coming closer to a right angle of an angle made by two back projections selected from back projections of one point of an object, wherein said back projections are crossing each other at a position in three-dimensional space and obtained from respective images, which are including said one point and captured by respective ones of m-number of image acquisition means (m: a plural number); and an object region determination step of, when the aforementioned evaluation quantity is equal to or larger than (or, equal to or smaller than) a predetermined value, determining the aforementioned position to be a region occupied by the aforementioned object, and outputting the determination result.

Still further, according to the present invention, provided is an object region extraction method comprising: an effectiveness evaluation quantity acquisition step of acquiring an evaluation quantity which increases (or decreases) with the coming closer to a right angle of an angle made by two back projections selected from back projections of one point of an object, wherein said back projections are crossing each other at a position in three-dimensional space and obtained from respective images, which are including said one point and captured by respective ones of m-number of image acquisition means (m: a plural number); and an object region determination step of, when the aforementioned evaluation quantity is equal to or larger than (or, equal to or smaller than) a predetermined value, determining the aforementioned position to be a region occupied by the aforementioned object, and outputting the determination result.

Advantageous Effects of Invention

According to the present invention, improved is non-extraction of an object region in three-dimensional space arising from mis-extraction of an object region from a camera image. Further, provided are an object region extraction system, an object region extraction method and an object region extraction program which can reduce incorrect extraction of an object region in three-dimensional space.

DESCRIPTION OF EMBODIMENTS

Figure 1:
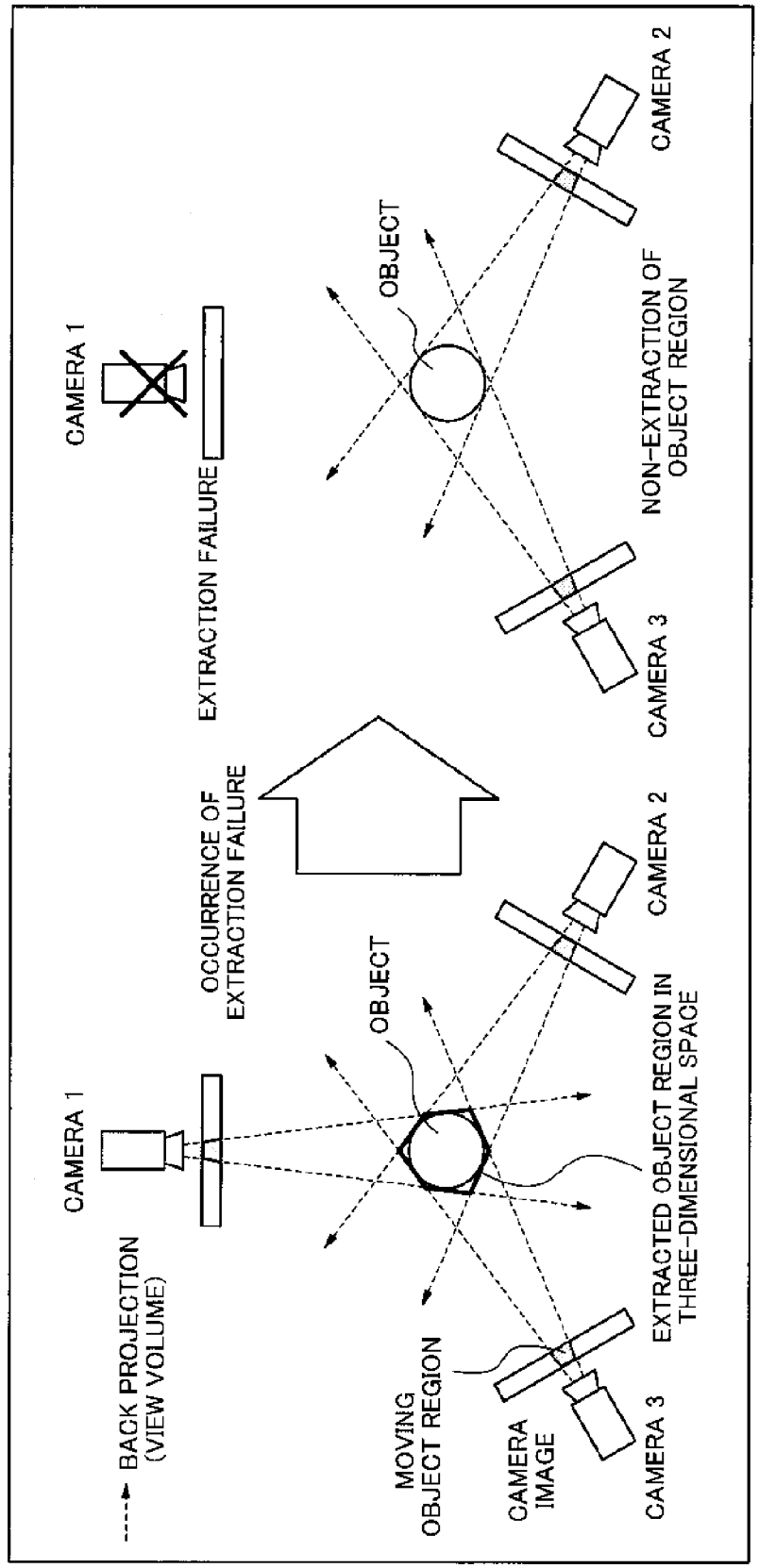
[FIG. 1] a diagram for describing a prior art.
Figure 2:
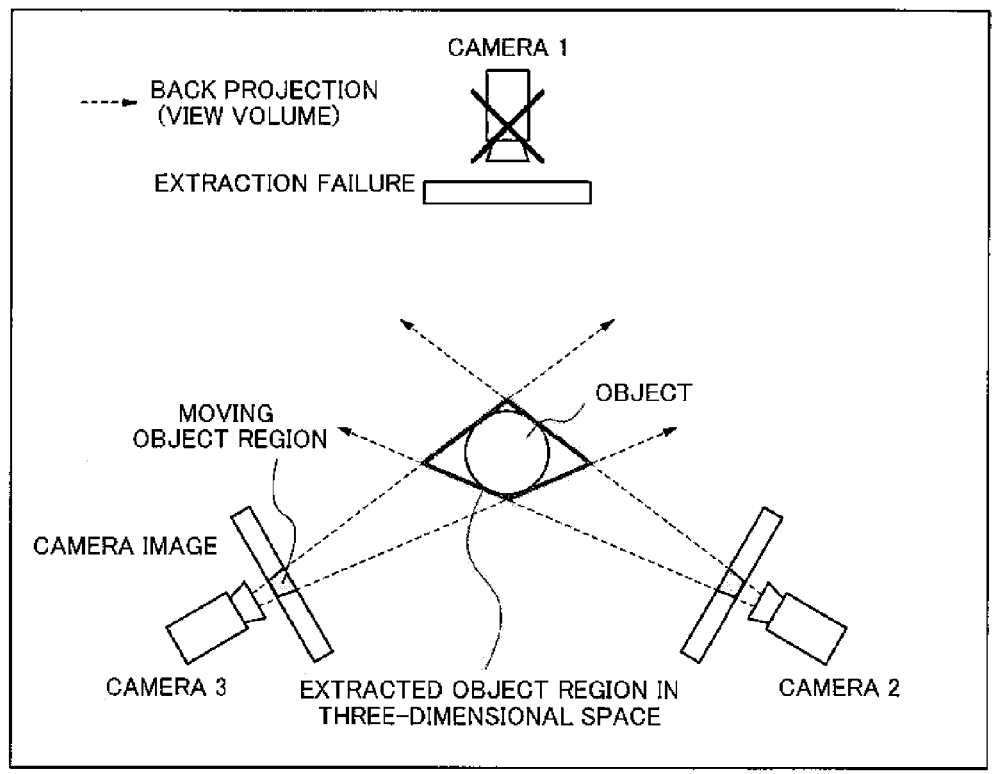
[FIG. 2] a diagram for describing a prior art.
Figure 3:
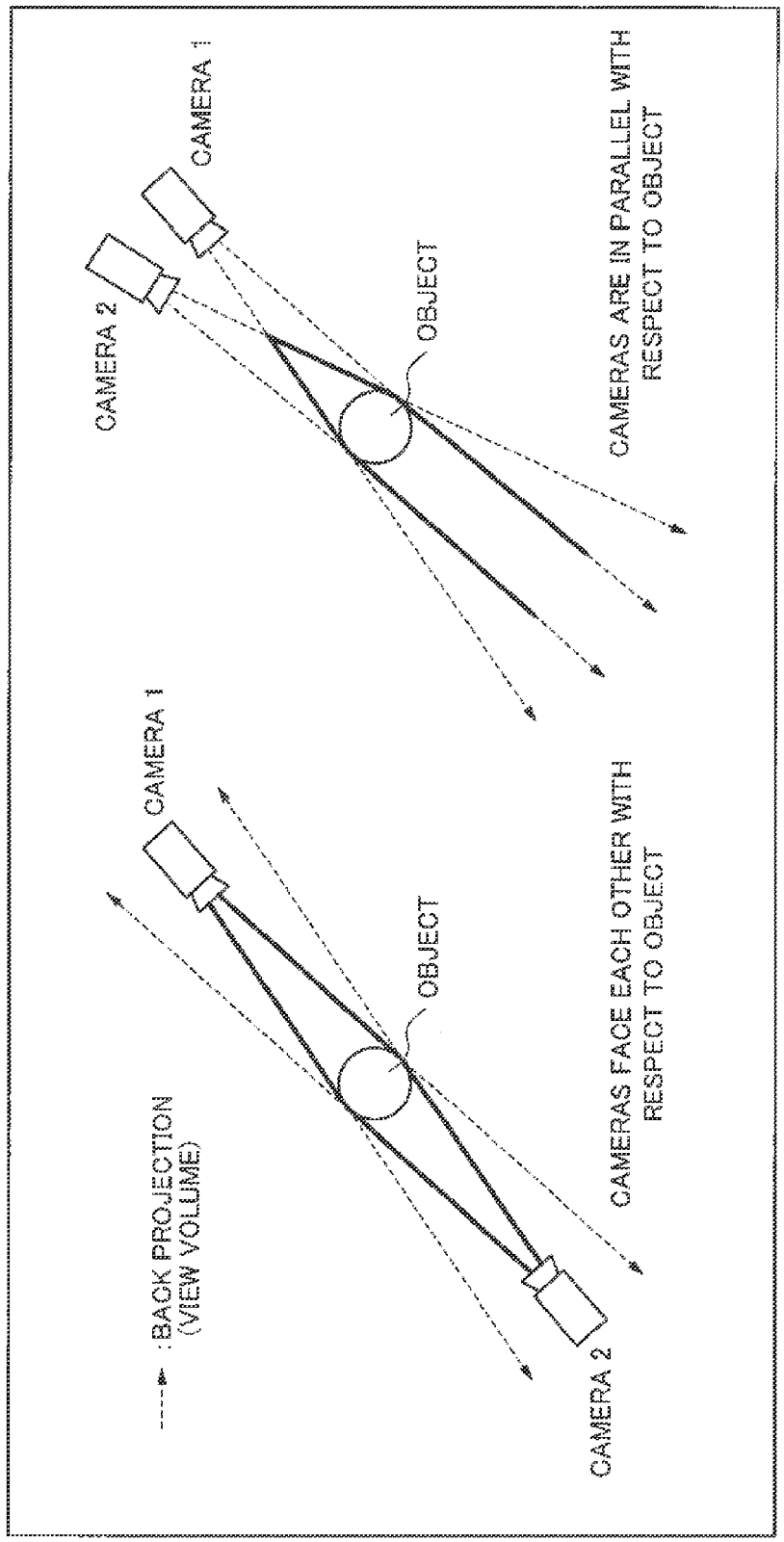
[FIG. 3] a diagram illustrating an object position with respect to which two cameras face each other or are in parallel.
Figure 4:
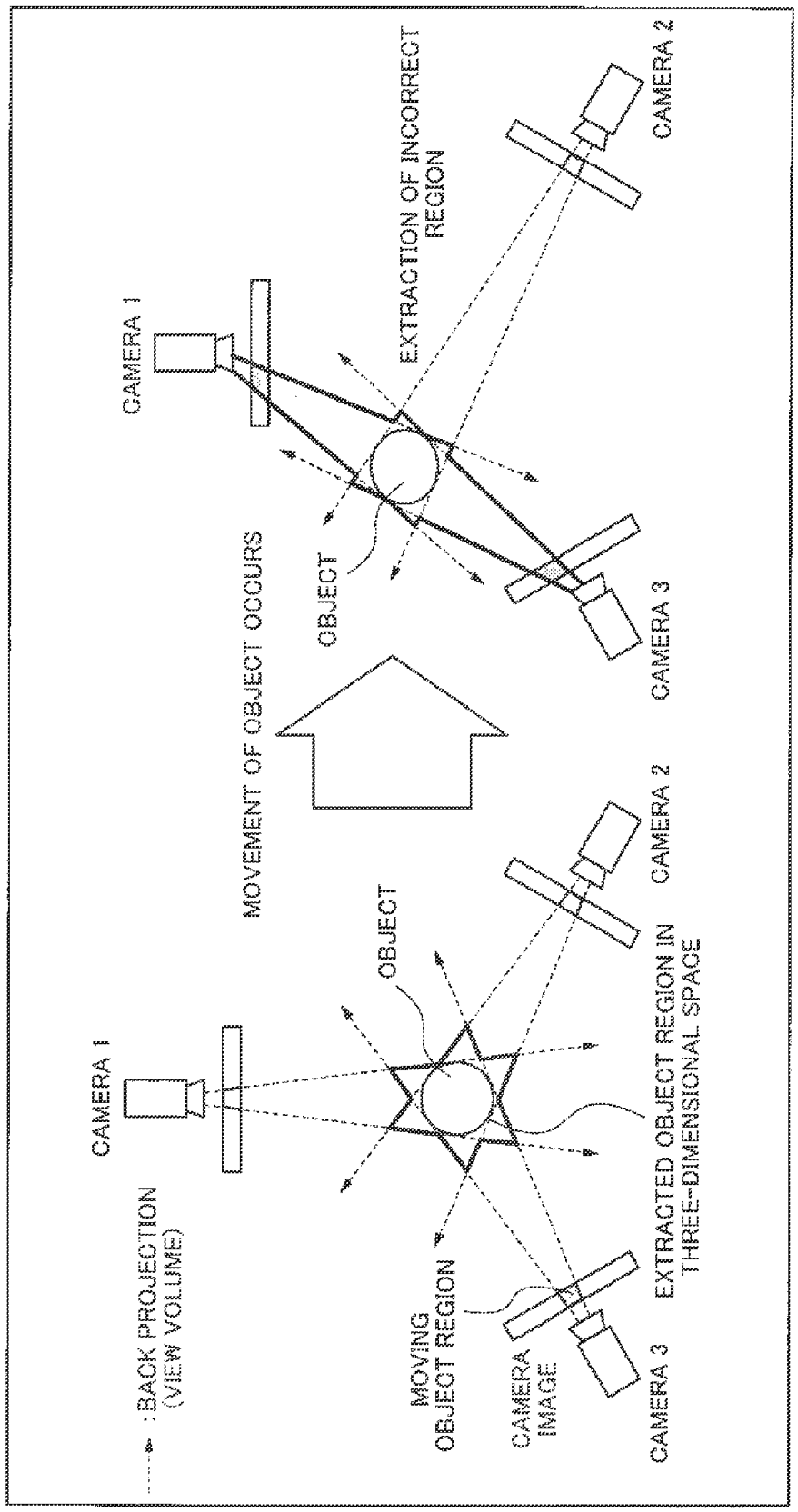
[FIG. 4] a diagram for describing that extraction of an incorrect region occurs even if simple improvement is performed in terms of non-extraction of an object region.

Hereinafter, exemplary embodiments of the present invention will be described using the drawings. In all of the drawings, the same signs are given to the respective same components, and their descriptions are properly omitted.

Here, each unit constituting a system of each exemplary embodiment is made up of a control unit, a memory, a program loaded on the memory, a storage unit storing a program such as a hard disk drive and an interface for network connection, and it is realized by an optional combination of hardware and software. Unless otherwise specified, there is no limitation on methods and devices for their realization.

The control unit is composed of an CPU (Central Processing Unit) or the like, and it controls the whole device by causing an operating system to operate, and reading a program and data from a recording medium installed in, for example, a driving device into a memory, it also executes a variety of processing according to them.

The recording medium is, for example, an optical disc, a flexible disc, a magneto-optical disc, an external hard disk, a semiconductor memory or the like, which records a computer program in a computer-readable manner. The computer program may be downloaded from an external computer connected to a communication network, which is not illustrated in the drawings.

Further, the block diagrams used in describing the respective exemplary embodiments do not show configurations in terms of hardware units, but do blocks in terms of functional units. These function blocks are realized by optional combinations of hardware and software. Further, in these diagrams, there are cases where the components of the respective exemplary embodiments are described as being realized by one physically connected device, but means for their realization is not limited to it. That is, the systems of the respective exemplary embodiments may be realized by two or more physically separated devices, connecting the plurality of devices by wire or wireless.

<First Exemplary Embodiment>

Figure 5:
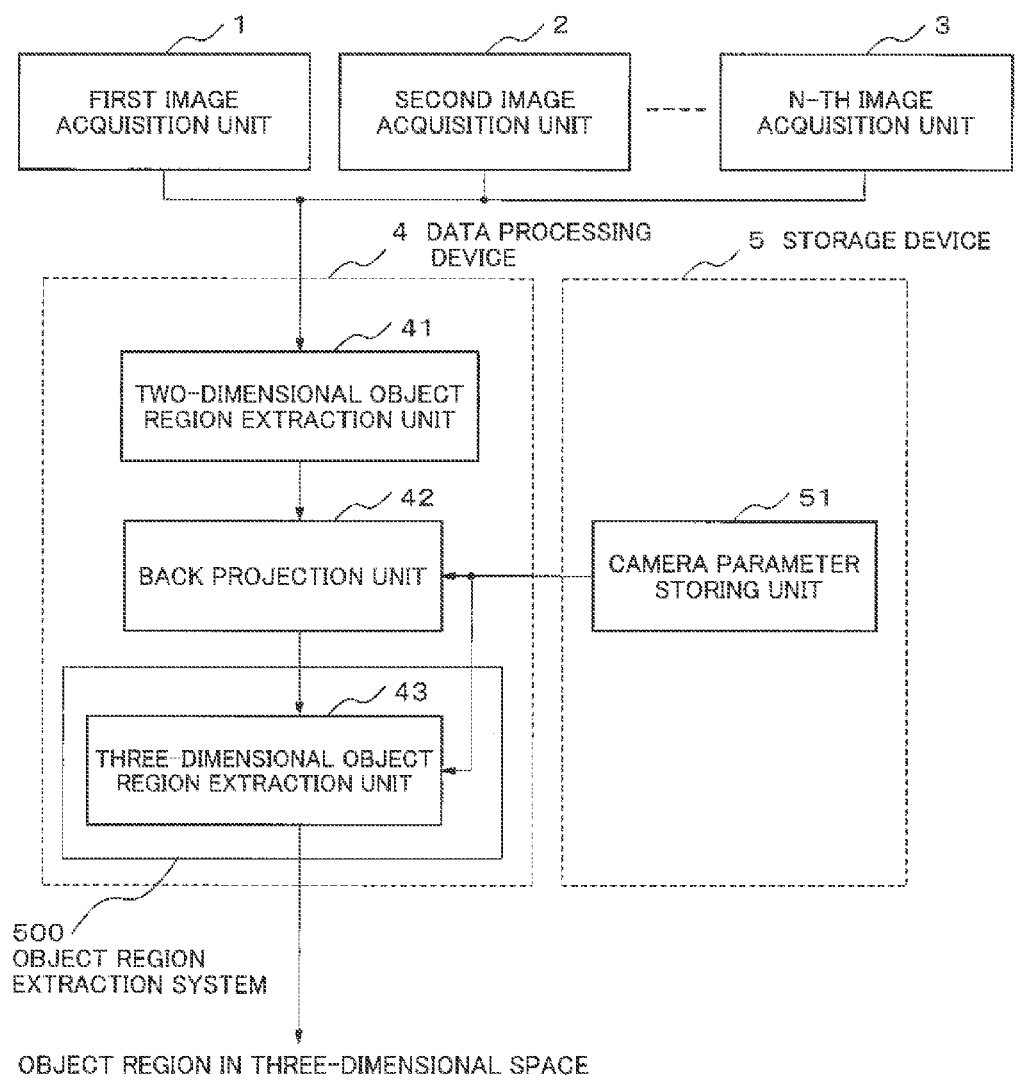
[FIG. 5] a block diagram showing a configuration of a first exemplary embodiment of the present invention.

Using FIG. 5, description will be given of a configuration of an object region extraction system 500 according to a first exemplary embodiment of the present invention. The object region extraction system 500 according to the first exemplary embodiment of the present invention comprises a three-dimensional object region extraction unit 43. The three-dimensional object region extraction unit 43 may be included in a data processing device 4 operating by program control. The object region extraction system 500 may further comprise a total of n-number of image acquisition units consisting of a first image acquisition unit 1 to an n-th image acquisition unit 3, each acquiring an image from a moving image captured by a camera or the like, and may also comprise a storage device 5 which stores information.

The storage device 5 comprises a camera parameter storing unit 51. The camera parameter storing unit 51 stores camera parameters corresponding to each of the image acquisition units (parameters for transformation between a two-dimensional coordinate of an image acquired from the image acquisition unit and a three-dimensional coordinate in three-dimensional space (internal/external parameters, a distortion factor and the like of the camera), a three-dimensional position and direction of the image acquisition unit and the like). The camera parameters are obtained by relating a two-dimensional coordinate with a three-dimensional coordinate. The two-dimensional and three-dimensional coordinates can be mutually transformed using camera parameters with respect to the corresponding image acquisition unit.

The data processing device 4 comprises a two-dimensional object region extraction unit 41, a back projection unit 42 and the three-dimensional object region extraction unit 43.

The two-dimensional object region extraction unit 41 acquires images synchronized at the first image acquisition unit 1 to n-th image acquisition unit 3, and performing on each of the images image processing such as background subtraction method, frame subtraction method and an object detection method using posterior probability, it extracts an object region image indicating an object region. The object region image is an image in which a region corresponding to an object and other regions on an original image are labeled by different values, which is, for example, a binary image in which pixels for an object region are represented by 1 and the others by 0.

The back projection unit 42 back-projects the object region image extracted by the two-dimensional object region extraction unit 41 into three-dimensional space, using the camera parameters stored in the camera parameter storing unit 51. This processing is carried out on all object region images each corresponding to the respective image acquisition units.

The three-dimensional object region extraction unit 43 extracts an object region in three-dimensional space, using the back projections obtained by the back projection unit 42 and the camera parameters stored in the camera parameter storing unit 51.

Figure 6:
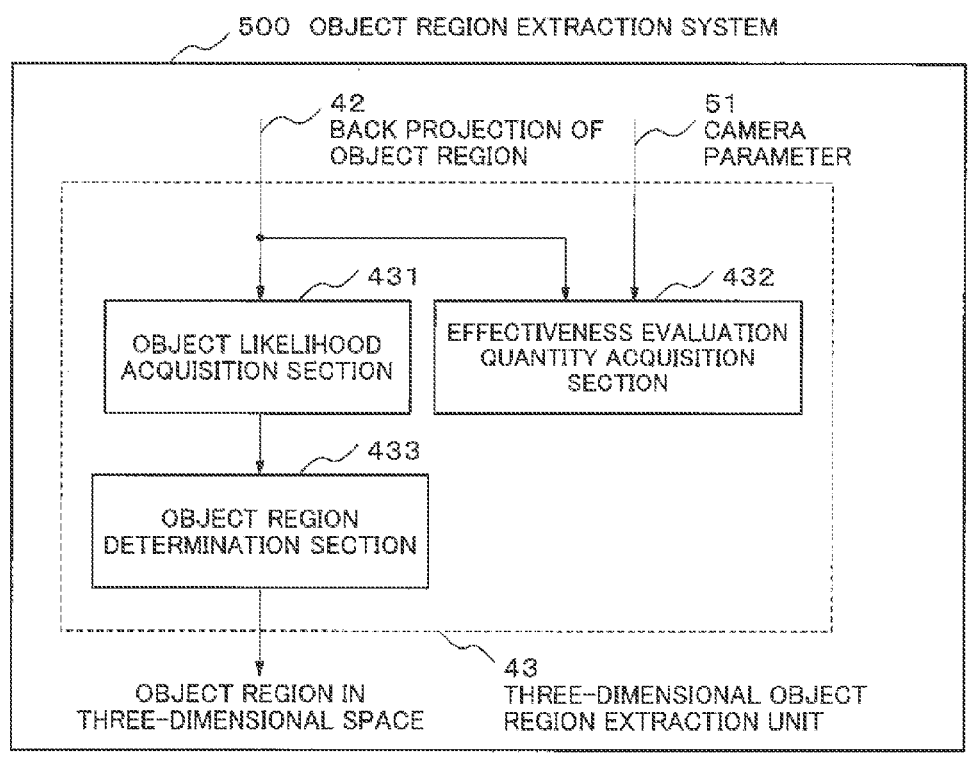
[FIG. 6] a block diagram showing a configuration of the first exemplary embodiment of the present invention.

Referring to FIG. 6, the three-dimensional object region extraction unit 43 comprises an effectiveness evaluation quantity acquisition section 432, an object region determination section 433 and an object likelihood acquisition section 431.

Figure 7:
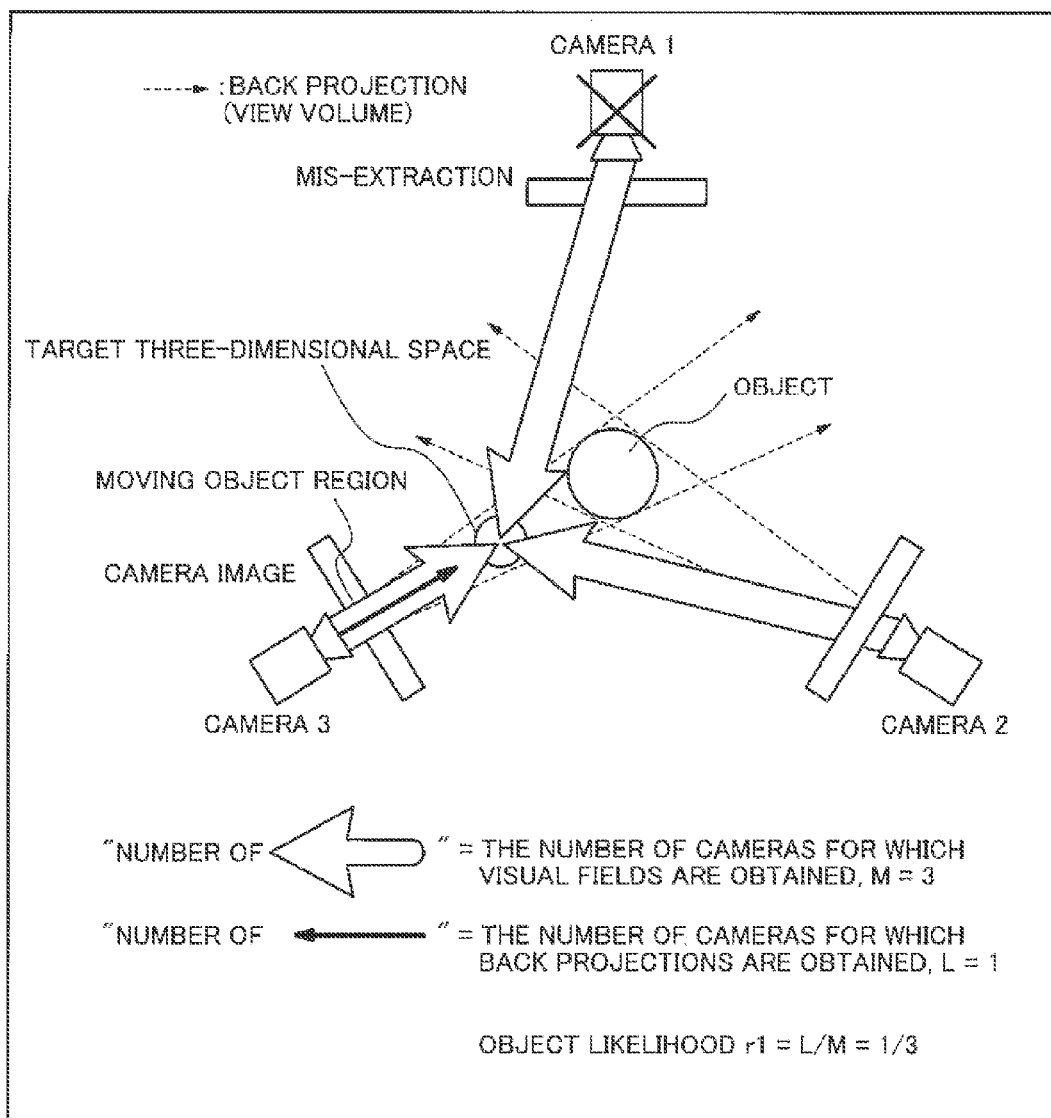
[FIG. 7] a diagram showing an example of acquiring an object likelihood in a target three-dimensional space, with respect to the first exemplary embodiment of the present invention.

The object likelihood acquisition section 431 acquires an object likelihood with respect to a three-dimensional space, using the back projections of an object region each corresponding to the respective image acquisition units, which were obtained by the back projection unit 42. The object likelihood is an index representing probability of the existence of an object in a three-dimensional space. This value basically becomes larger when back projections are obtained from a larger number of cameras in a three-dimensional space. As shown in FIG. 7, the object likelihood is, for example, a ratio of the number of cameras from which back projections are actually obtained, $L(x,y,z)$, to the number of cameras for which visual fields are obtained, $M(x,y,z)$, in a target three-dimensional space. In this respect, the object likelihood acquisition section 431 acquires an object likelihood $r1(x,y,z)$ by calculating it as in an equation (1).

$$r_1(x, y, z) = \frac{L(x, y, z)}{M(x, y, z)} \quad (1)$$

Here, x, y and z show a position in three-dimensional space, and $M(x,y,z)$ and $L(x,y,z)$ satisfy conditions such that $M(x,y,z) \leq n$ and $L(x,y,z) \leq M(x,y,z)$.

Figure 8:
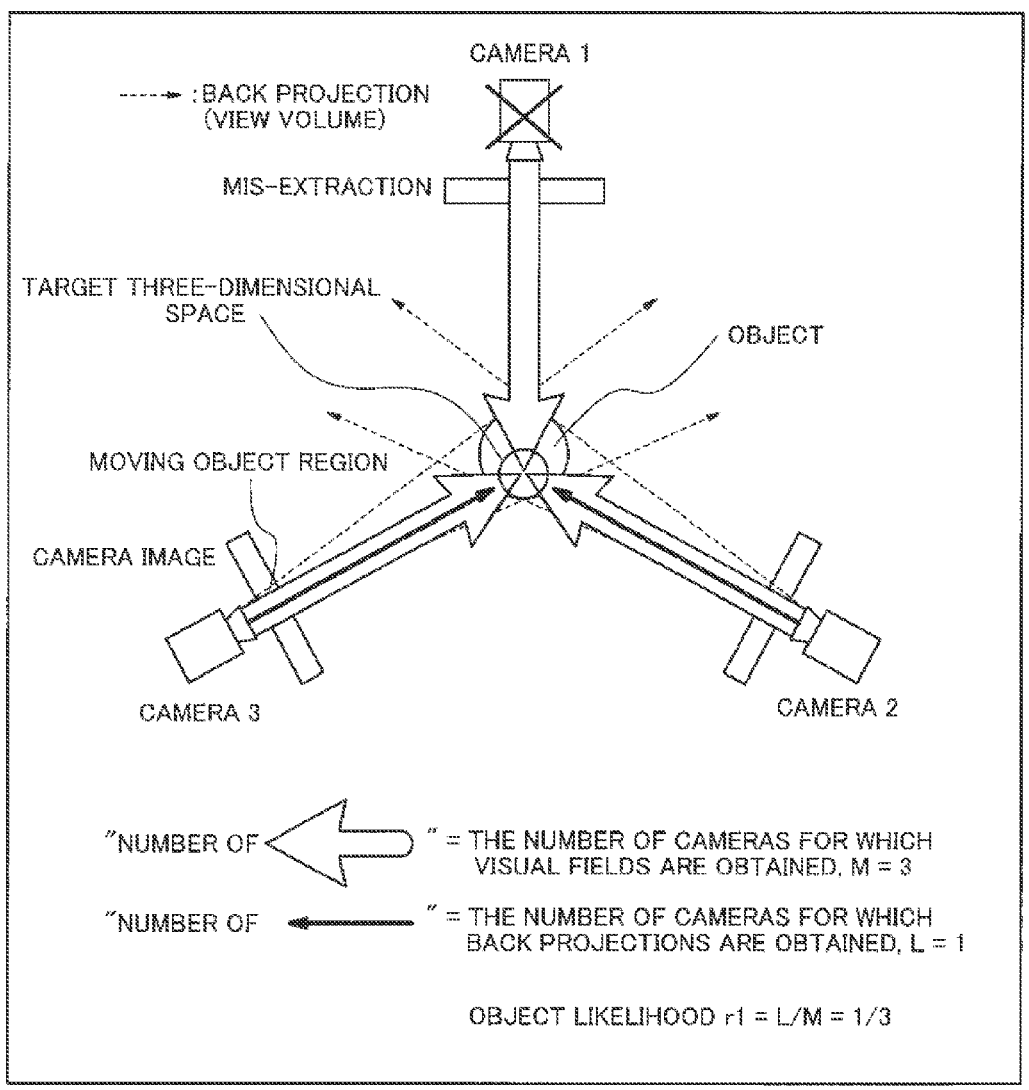
[FIG. 8] a diagram showing an example of acquiring an object likelihood in a target three-dimensional space, with respect to the first exemplary embodiment of the present invention.

The obtained object likelihood $r1(x,y,z)$ takes, for example, a value from 0 to 1, as in the equation (1). In this case, the object likelihood $r1(x,y,z)$ becomes larger (approaches 1) and smaller (approaches 0) respectively when probability of the existence of an object is higher and lower in the three-dimensional space of (x,y,z). Here, the object likelihood $r1(x,y,z)$ does not need to be limited to a value in the range from 0 to 1, and may be any value reflecting probability of the existence of an object. In the following description, for convenience, the object likelihood $r1(x,y,z)$ is assumed to be in the range $0 \leq r1(x,y,z) \leq 1$. FIG. 8 shows an example of acquiring the object likelihood in a three-dimensional space different from that in FIG. 7.

Although the equation (1) was employed in the above description as an example of calculating the object likelihood $r1(x,y,z)$, the object likelihood $r1(x,y,z)$ may be generalized as in an equation (1-1).

$$r_1(x, y, z) = f_3\left(\frac{L(x, y, z)}{M(x, y, z)}\right) \quad (1\text{-}1)$$

Here, $f3(x)$ is a monotonously increasing function having a characteristic $f3(x1) < f3(x2)$ $(x1 < x2)$.

Further, largeness of the number of cameras for which back projections are obtained, which represents the object likelihood, has the same meaning as the fact that the number of cameras for which visual fields are obtained, $M(x,y,z)$, is the same as that of cameras for which back projections are obtained, $L(x,y,z)$. Therefore, the object likelihood $r1(x,y,z)$ may be calculated as in an equation (1-2).

$$r_1(x, y, z) = \alpha^{(M(x,y,z) - L(x,y,z))} \quad (1\text{-}2)$$

Here, $\alpha$ is assumed to be a coefficient taking a value from 0 to 1.

Figure 9:
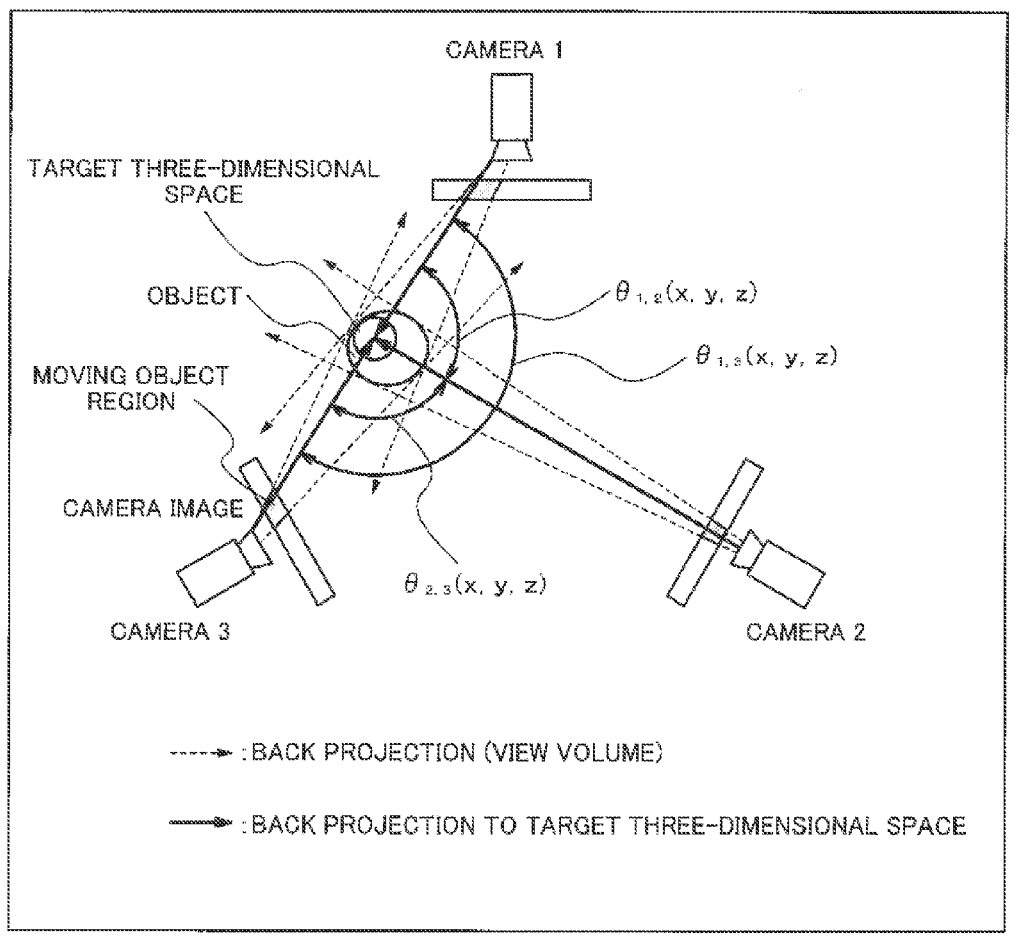
[FIG. 9] a diagram showing an example of all pairs of back projections in a target three-dimensional space and their angles, with respect to the first exemplary embodiment of the present invention.

Using the back projections of an object region each corresponding to the respective image acquisition units, which are obtained by the back projection units 42, and the camera parameters stored in the camera parameter storing unit 51, the effectiveness evaluation quantity acquisition section 432 evaluates the effectiveness of the back projections of an object region from the respective image acquisition unit with respect to a three-dimensional space, and thus acquires the evaluation quantity. Here, the effectiveness of back projections is one indicating how effective the back projections of an object region from the image acquisition units obtained with respect to a three-dimensional space are, in terms of extraction of an object region enabling identification of the object position. It is specifically an angle made by two back projections. If an angle made by two back projections is close to rectangular (90 degrees), the target three-dimensional space is determined to be an object from different angles, and this three-dimensional space also is a region making it easy to uniquely determine an object position. In this way, it can be determined that the obtained back projections are effective for extracting an object region enabling identification of the object position, and that the effectiveness of the back projections is high (the evaluation quantity is high). A method of acquiring an effectiveness evaluation quantity is as follows. As shown in FIG. 9, the effectiveness evaluation quantity acquisition section 432 extracts all pairs of back projections from that obtained in a target three-dimensional space. Then, the effectiveness evaluation quantity acquisition section 432 calculates an angle $\theta c1,c2(x,y,z)$ for each of the pairs of back projections (an angle made by the positions of two cameras and the position of the target three-dimensional space). Then, the effectiveness evaluation quantity acquisition section 432 calculates an evaluation quantity $r2(x,y,z)$ representing the effectiveness of the back projections using, for example, an equation (2). The equation (2) is an equation by which an angle showing the highest rectangularity is selected from the angles with respect to all of the pairs of back projections, and is given as a value of the evaluation quantity.

$$r_2(x, y, z) = 1 - \min_{c1,c2 \in S}(|\cos\theta_{c1,c2}(x, y, z)|) \quad (2)$$

Here, x, y and z express a position in three-dimensional space. The c1 and c2 indicate a pair of back projections corresponding to the camera numbers, and the case of c1=c2 is omitted. The S is a set of all pairs of back projections with respect to all of the obtained back projections. The $\theta c1,c2(x, y, z)$ is an angle for back projections respectively corresponding to the camera numbers c1 and c2 with respect a position (x,y,z) in three-dimensional space (an angle made by the camera positions of respectively the camera numbers c1 and c2 and by the position (x,y,z) in three-dimensional space).

Although the equation (2) was used in the above description as an example of calculating the estimation quantity r2(x,y,z) representing the effectiveness of back projections, the estimation quantity r2(x,y,z) may be calculated as in an equation (2-1).

$$r_2(x, y, z) = \min_{c1,c2 \in S}(|\sin\theta_{c1,c2}(x, y, z)|) \quad (2\text{-}1)$$

Furthermore, because what is required of the evaluation quantity r2(x,y,z) for representing the effectiveness of back projections is only to represent the degree of rectangularity of an angle made by a pair of back projections, it is also possible to evaluate every angle made by each pair of the back projections by a function giving higher value as the angle comes closer to rectangular, and thus determine the highest value among them to be the evaluation quantity r2(x,y,z). The rectangularity of an angle is an index expressing the degree of being closeness of an angle to rectangular, that is, 90 degrees.

The thus obtained evaluation quantity r2(x,y,z) becomes larger, reflecting that the effectiveness is higher, when an angle made by a pair of back projections is close to rectangular, accordingly the target three-dimensional space is determined to be an object from different angles, and thus unique determination of an object position is easy, and it becomes smaller in the opposite case. In the above-described cases of the evaluation quantity r2(x,y,z), it takes a value in the range from 0 to 1, but an equation for calculating the evaluation quantity is not limited to the above-described ones.

Figure 10:
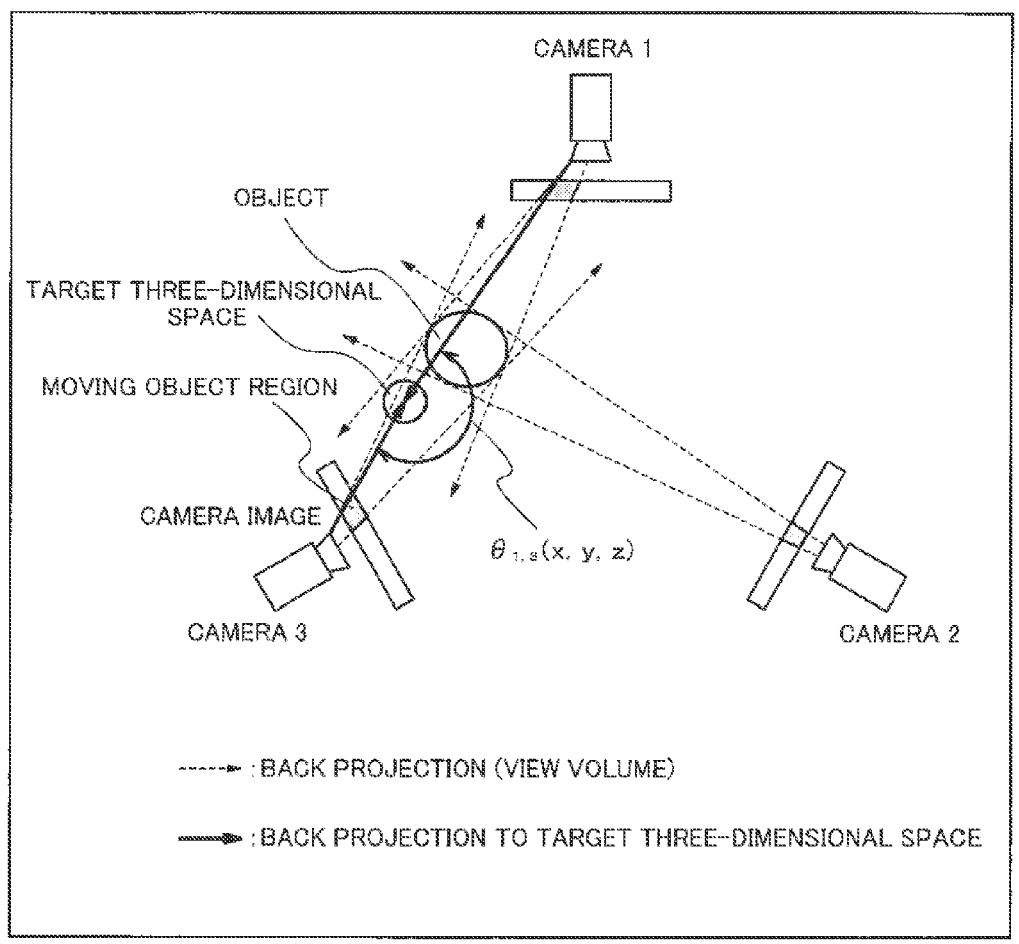
[FIG. 10] a diagram showing an example of all pairs of back projections in a target three-dimensional space and angles they make, with respect to the first exemplary embodiment of the present invention.

FIG. 10 shows an example of a three-dimensional space different form that in FIG. 9. With respect to the three-dimensional space shown in FIG. 10, an angle made by a pair of back projections differs significantly from rectangular, thus the space is not determined to be an object from different angles, and unique determination of an object position is difficult. Accordingly, the three-dimensional space shown in FIG. 10 is a space of low effectiveness of back projections.

The object region determination section 433 determines whether a three-dimensional space (x,y,z) is an object region, using the evaluation quantity r2(x,y,z) representing the effectiveness of back projections, which was obtained at the effectiveness evaluation quantity acquisition section 432, and thus extracts an object region in three-dimensional space. Alternatively, the object region determination section 433 determines whether a three-dimensional space (x,y,z) is an object region, using the object likelihood r1(x,y,z) obtained in the object likelihood acquisition section 431 and the evaluation quantity r2(x,y,z) representing the effectiveness of back projections, obtained at the effectiveness evaluation quantity acquisition section 432, and thus extracts an object region in three-dimensional space. The following description will be given, taking an example, of a method by which the object region determination section 433 extracts an object region in three-dimensional space using both of the object likelihood r1 and the evaluation quantity r2.

There are a variety of methods by which the object region determination section 433 extracts an object region. For example, when the evaluation quantity r2 is equal to or larger than a threshold value, with respect to a target three-dimensional space (x,y,z), the object region determination section 433 may extract the three-dimensional space as an object region. Alternatively, when the object likelihood r1 is equal to or larger than a threshold value and also the evaluation quantity r2 is equal to or larger than a threshold value, with respect to a target three-dimensional space (x,y,z), the object region determination section 433 may extract the three-dimensional space as an object region. Still alternatively, the object region determination section 433 may extract a target three-dimensional space (x,y,z) as an object region by calculating a posterior probability P($\omega$|r1,r2) of object/non-object from the object likelihood r1 and the evaluation quantity r2, using a following equation (3), with respect to the target three-dimensional space (x,y,z), and thus using Bayes' decision law of comparing the posterior probability of object/non-object.

$$P(\omega | r_1, r_2) = \frac{p(r_1 | \omega)p(r_2 | \omega)P(\omega)}{p(r_1, r_2)} \quad (3)$$

$$= \frac{p(r_1 | \omega)p(r_2 | \omega)P(\omega)}{\sum_{\omega'=0}^{1} p(r_1 | \omega')p(r_2 | \omega')P(\omega')}$$

Here, $\omega$ is a value representing a category indicating whether an object ($\omega$=1) or a non-object ($\omega$=0). The p(r1|$\omega$) and p(r2|$\omega$) are probability density functions. The P($\omega$) is a prior probability. The p(r1|$\omega$) and p(r2|$\omega$) may be obtained by learning, and may also be approximated by a sigmoid function using knowledge. The prior probability P($\omega$) may be set to be a constant value (for example, 0.5) regardless of the category of object/non-object, and may also be set in advance at a value determined by prior knowledge for each position in the three-dimensional space. For example, when an object is a person, because possibility of the person's existing in a space near the ceiling, at an obstacle or the like is low, the prior probability of being an object P($\omega$=1) at a position in such three-dimensional spaces may be set at a small value.

In addition to the methods described above, by calculating a value from the object likelihood r1 and the evaluation quantity r2 using a following equation (4), with respect to a target three-dimensional space (x, y,z), the object region determination section 433 may extract the three-dimensional space as an object region if the value $\psi$ is equal to or larger than a threshold value.

$$\psi = \max(f_1(r_1), f_2(r_2)) \quad (4)$$

Here, f1(x) and f2(x) are weights expressed by a sigmoid function or the like (a monotonously increasing function).

Further additionally, the object region determination section 433 may learn in advance a classifier which receives the object likelihood r1 and the evaluation quantity r2 as input and outputs the category of whether an object ($\omega$=1) or a non-object ($\omega$=0), and may then input the object likelihood r1 and the evaluation quantity r2 to the classifier to obtain its output value. The object region determination section 433 may use a method where, when the above-mentioned output value is equal to or larger than a threshold value, the target three-dimensional space (x,y,z) is extracted as an object region. In this case, as the learning method, a neural network (NN), a support vector machine (SVM), general learning vector quantization (GLVQ) or the like can be used. The learning may be performed on the whole of a three-dimensional space, and may also be done on each point of the space.

Although it has been described above that the object region determination section 433 determines and extracts an object region in three-dimensional space on the basis of a value obtained by the equations (3) or (4) or of an output value of the above-mentioned classifier, it may output directly the object likelihood r1 and the evaluation quantity r2 as results with respect to a three-dimensional space, thus making them used for estimating an object position.

Further, although it has been described above that the object region determination section 433 extracts an object region by acquiring the object likelihood r1 and the evaluation quantity r2 for each position in a three-dimensional space, it may extract an object region by acquiring the object likelihood r1 and the evaluation quantity r2 for the vicinity of a position in a three-dimensional space and extending the above-described methods.

Further, the object region determination section 433 may calculate the evaluation quantity r2 using, for example, a function which monotonously non-decreases as an angle made by a pair of back projections comes closer to 90 degrees. Further, the object region determination section 433 may set a value decreasing (or non-increasing) as an angle made by a pair of back projections comes closer to 90 degrees, as the evaluation quantity r2. In this case, the object region determination section 433 may determine a three-dimensional space to be a region occupied by an object if the evaluation quantity for the space is equal to or smaller than a predetermined value.

Next, with reference to FIGS. 11, 12, 13 and 14, detail description will be given of operation of the object region extraction system 500 according to the first exemplary embodiment of the present invention.

The first image acquisition unit 1 to the n-th image acquisition unit 3 each acquires an image from a moving image captured by a camera or the like. The two-dimensional object region extraction unit 41 acquires synchronized images from the n-number of image acquisition units (Step S1 in FIG. 11), and by performing image processing such as background subtraction method on each of the images, it extracts object region images each indicating an object region (Step S2 in FIG. 11).

Figure 11:
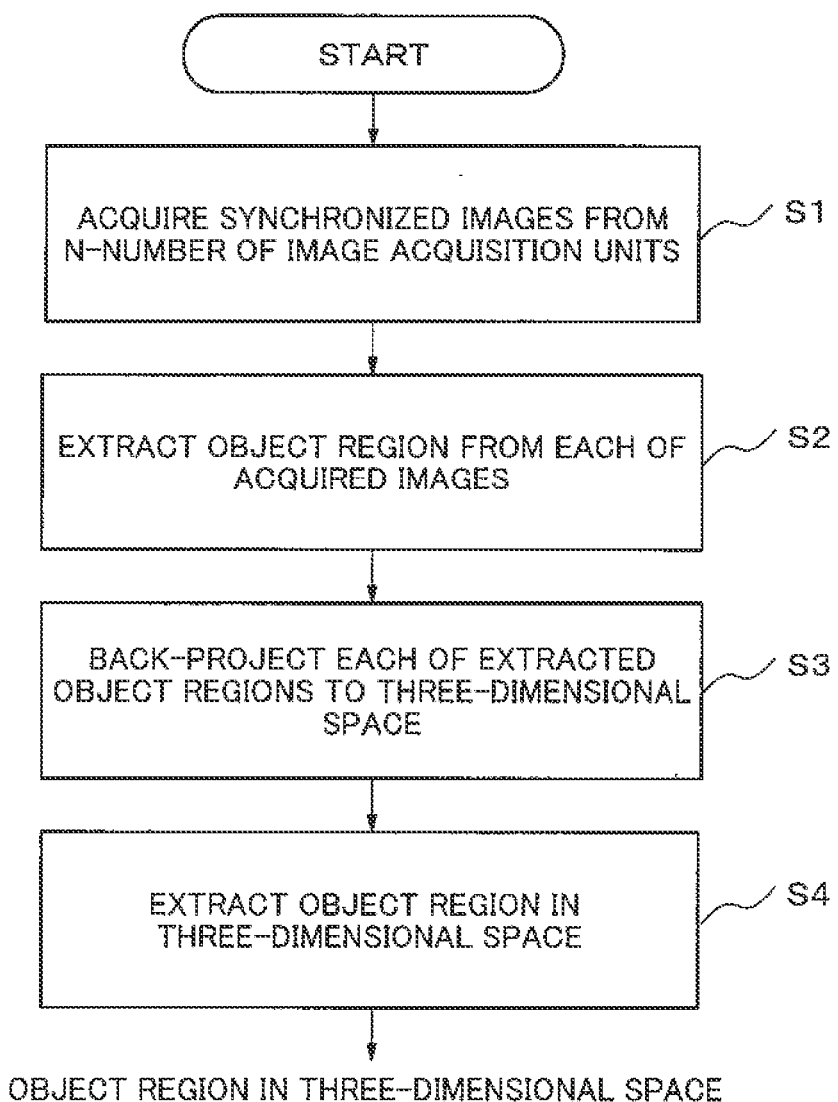
[FIG. 11] a flow chart showing operation of the first exemplary embodiment of the present invention.

Using the camera parameters stored in the camera parameter storing unit 51, the back projection unit 42 back-projects the object region images each corresponding to the respective image acquisition units, which were extracted by the two-dimensional object region extraction unit 41, into three-dimensional space (Step S3 in FIG. 11). The three-dimensional object region extraction unit 43 extracts an object region in three-dimensional space, using the back projections of an object region each corresponding to the respective image acquisition units, which were obtained by the back projection unit 42, and the camera parameters stored in the camera parameter storing unit 51 (Step S4 in FIG. 11).

Step S4 in FIG. 11 will be described in more detail using FIGS. 12, 13 and 14. The object likelihood acquisition section 431 acquires the number of cameras for which visual fields are obtained with respect to the target three-dimensional space (x,y,z), M(x,y,z) (Step S401 in FIG. 12). Because M(x,y,z) is a value which can be fixed in three-dimensional space if the positions and directions of the cameras and the position and shape of an obstacle are determined, it may be determined in advance in the whole of a predetermined three-dimensional space. Here, the predetermined three-dimensional space is a space with respect to which the user wants to see whether an object exists, and a range of the space may be determined in advance, and also the user may set the space using parameters or the like. Alternatively, it may be the OR space of regions constructed by back projections (view volumes). For example, the predetermined three-dimensional space may be the whole space of a room, that of a corridor and other optional spaces. As the next step, from the obtained back projections of an object region each corresponding to the respective image acquisition units, the object likelihood acquisition section 431 acquires the number of cameras for which back projections with respect to the target three-dimensional space (x,y,z) are obtained, L(x,y,z) (Step S402 in FIG. 12). Then, the object likelihood acquisition section 431 calculates a ratio of the number of cameras for which back projections are obtained, L(x,y,z), to the number of cameras for which visual fields are obtained, M(x,y,z), by the equation (1), and acquires the ratio as the object likelihood $r1(x,y,z)$ (Step S403 in FIG. 12). Alternatively, the object likelihood acquisition section 431 may calculate and acquire the object likelihood $r1(x,y,z)$ using the equations (1-1), (1-2) or the like. When the processes up to Step S403 are completed, the object region extraction system 500 determines if the processes from Step S401 to Step S403 have been performed on the whole of the predetermined three-dimensional space (Step S404 in FIG. 12), and repeats the processes from Step S401 to Step S403 until they are completely performed on the whole of the predetermined three-dimensional space (No at Step S404 in FIG. 12).

Description will be continued below of when the processes are completed on the whole of the predetermined three-dimensional space (Yes at Step S404 in FIG. 12). With respect to the target three-dimensional space, the effectiveness evaluation quantity acquisition section 432 extracts all pairs of back projections from the obtained back projections of an object region each corresponding to the respective image acquisition units, and acquires an angle $\theta c1,c2$ for each of the pairs of back projections on the basis of the positions of two cameras (acquired from the camera parameters) and the position of the target three-dimensional space (Step S405 in FIG. 13). Further, the effectiveness evaluation quantity acquisition section 432 acquires a value of the evaluation quantity r2 representing the effectiveness of the back projections, calculating it by the equation (2) using every angle $\theta c1,c2$ for all pairs of the back projections with respect to the target three-dimensional space (Step S406 in FIG. 13). Alternatively, the effectiveness evaluation quantity acquisition section 432 may use a method of calculating and acquiring the evaluation quantity r2 using the equation (2-1), or that of evaluating every angle for all pairs of the back projections by a function giving a higher value as the angle comes closer to rectangular, and then calculating and acquiring the highest one among the evaluated values as the evaluation quantity r2. When the processes up to Step S406 are completed, the object region extraction system 500 determines if the processes from Step S405 to Step S406 have been performed on the whole of the predetermined three-dimensional space (Step S407 in FIG. 13), and repeats the processes from Step S405 to Step S406 until they are completely performed on the whole of the predetermined three-dimensional space (No at Step S407 in FIG. 13).

Description will be continued below of when the processes are completed on the whole of the predetermined three-dimensional space (Yes at Step S407 in FIG. 13). Using the object likelihood r1(x,y,z) obtained at the object likelihood acquisition section 431 and the evaluation quantity r2(x,y,z) representing the effectiveness of the back projections, which was obtained at the effectiveness evaluation quantity acquisition section 432, the object region evaluation section 433 determines whether the three-dimensional space (x,y,z) is an object region and extracts it as an object region in three-dimensional space (Step S408 in FIG. 14). For example, if the object likelihood r1 is equal to or larger than a threshold value and also the evaluation quantity r2 is equal to or larger than a threshold value, the object region evaluation section 433 may determine and extract the target three-dimensional space (x,y,z) as an object region. Alternatively, the object region determination section 433 may determine and extract the target three-dimensional space (x,y,z) as an object region, by calculating a posterior probability P($\omega$|r1,r2) of object/non-object from the object likelihood r1 and the evaluation quantity r2, using the equation (3), and then comparing the posterior probability of object/non-object (Bayes' decision law). Still alternatively, the object region evaluation section 433 may calculate $\psi$ from the object likelihood r1 and the evaluation quantity r2, using the equation (4), and determine and extract the target three-dimensional space (x,y,z) as an object region if the calculated w is equal to or larger than a threshold value. Yet alternatively, the object region determination section 433 may learn in advance a classifier which receives the object likelihood r1 and the evaluation quantity r2 as input and then outputs a category of whether an object ($\omega$=1) or a non-object ($\omega$=0), and inputting the object likelihood r1 and the evaluation quantity r2 to the classifier to obtain its output value, the object region determination section 433 may determine and extract the target three-dimensional space (x,y,z) as an object region if the output value is equal to or larger than a threshold value. When the process of Step S408 is completed, the object region extraction system 500 determines if the process of Step S408 has been performed on the whole of the predetermined three-dimensional space (Step S409 in FIG. 14), and repeats the process of Step S408 until it is completely performed on the whole of the predetermined three-dimensional space (No at Step S409 in FIG. 14). When the process has been completed on the whole of the predetermined three-dimensional space (Yes at Step S409 in FIG. 14), the object region extraction system 500 ends the processes at Step S4.

After the ending of Step S4, the object region extraction system 500 returns to Step S1 and stays in a standby state until acquisition of synchronized images becomes possible.

Figure 12:
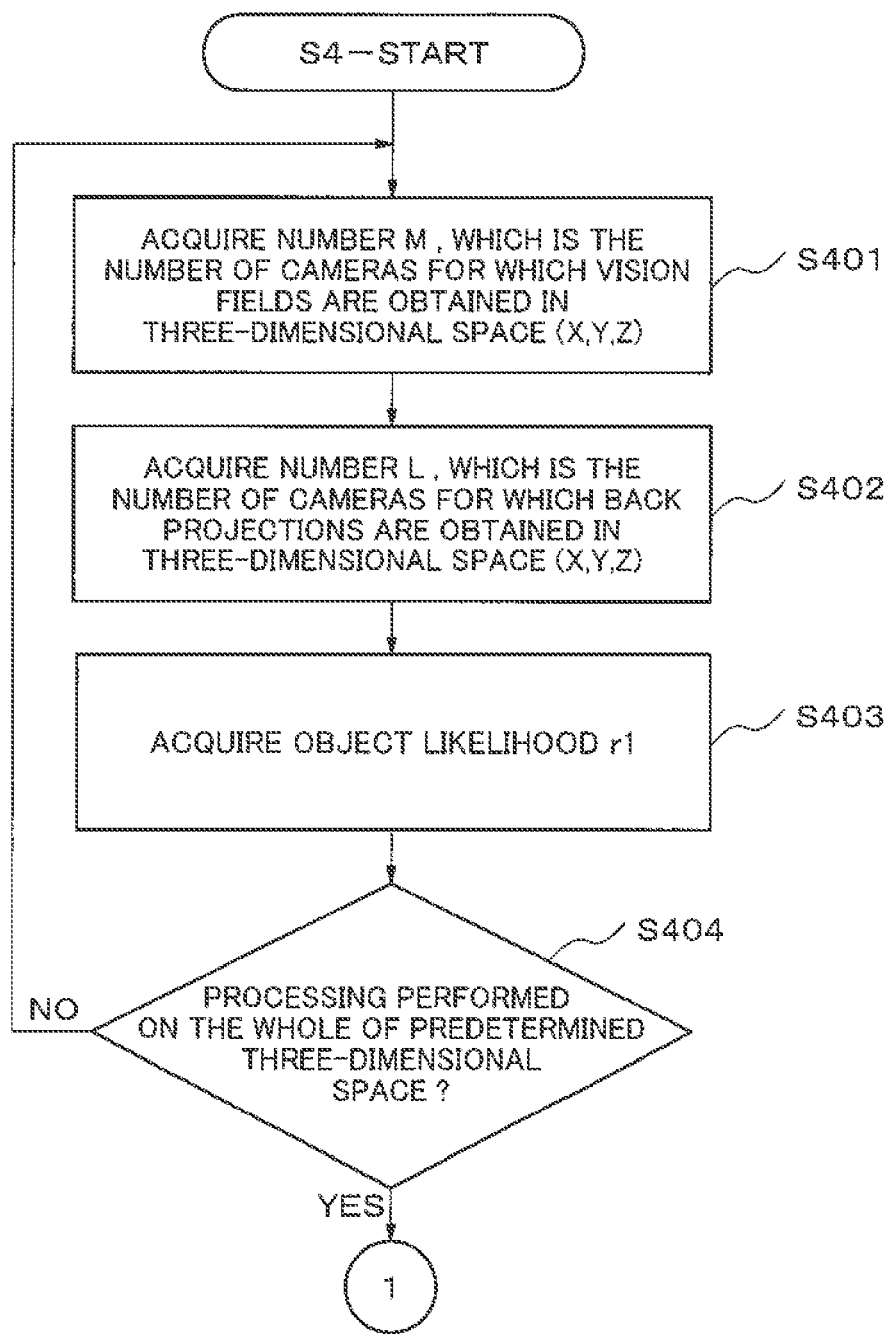
[FIG. 12] a flow chart showing operation of the first exemplary embodiment of the present invention.
Figure 13:
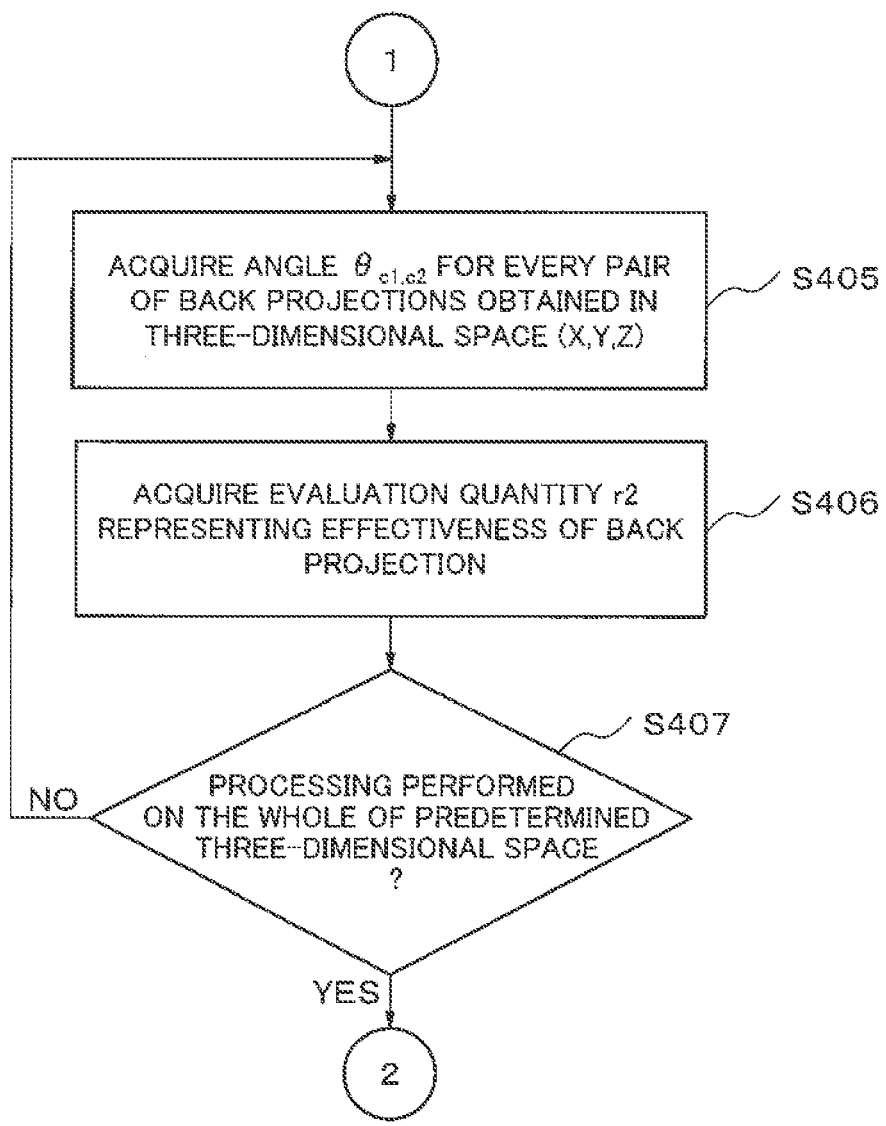
[FIG. 13] a flow chart showing operation of the first exemplary embodiment of the present invention.
Figure 14:
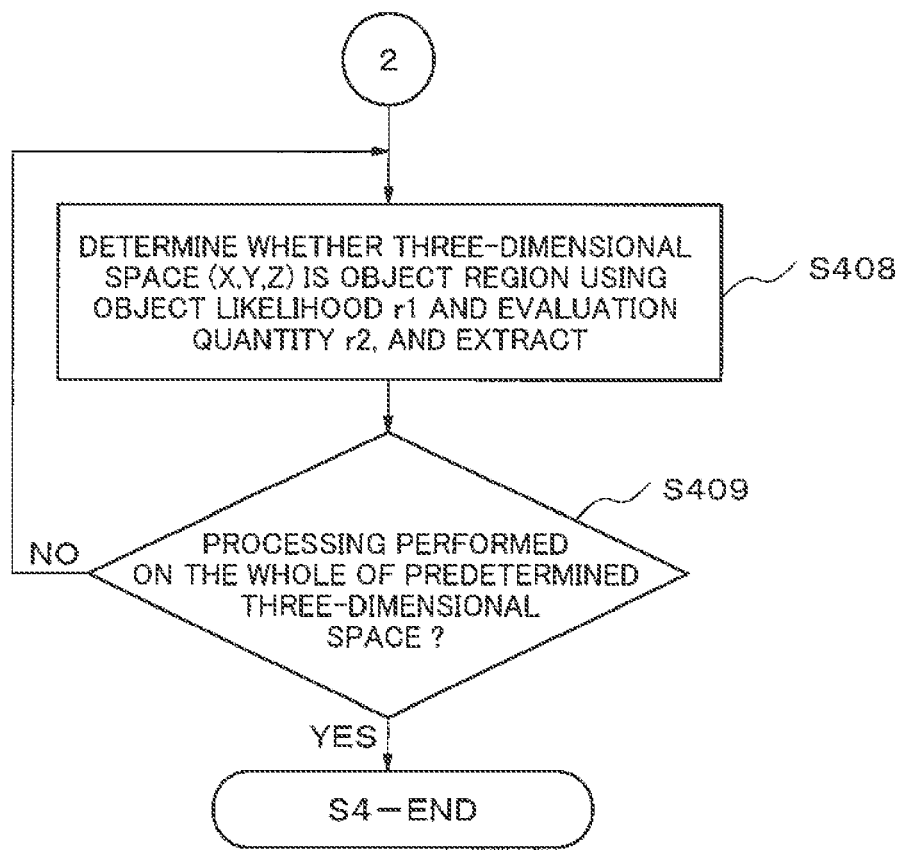
[FIG. 14] a flow chart showing operation of the first exemplary embodiment of the present invention.

With respect to the processes at Step S4 shown in FIGS. 12, 13 and 14, because the respective processes of acquiring the object likelihood r1, acquiring the evaluation quantity r2 and determining whether an object region or not are independent in terms of a position in three-dimensional space, their processing order may be changed properly. For example, between the series of steps of acquiring the object likelihood r1 shown in FIG. 12 (Step S401 to Step S404) and that of acquiring the evaluation quantity r2 shown in FIG. 13 (Step S405 to Step S407), either may be carried out prior to the other. Further, it is possible to omit Steps S404 and S407 and change the destination of the case of No at S409 to before Step S401.

Next, advantageous effects of the first exemplary embodiment of the present invention will be described. In its extracting an object region in three-dimensional space by the use of back projections of object region images extracted from a plurality of camera images, with respect to an angle made by a pair of back projections in three-dimensional space, the object region extraction system 500 according to the first exemplary embodiment of the present invention calculates rectangularity of the angle. Then, the object region extraction system 500 evaluates the effectiveness of the back projections (how effective the back projections of an object region are for extracting an object region enabling identification of the object position) which represents that the target three-dimensional space is determined to be an object from different angles and that the object is one from which unique determination of an object position is easily performed, and thus extracts an object region in three-dimensional space. Accordingly, the object region extraction system 500 can reduce extraction of an incorrect region in three-dimensional space. Additionally, the object region extraction system 500 can reduce the number of incorrect regions mistakenly extracted owing to a movement of an object to a position with respect to which two cameras face each other or are in parallel (owing to a relative positional relationship between the object and the cameras).

Further, by using the object likelihood in addition to the evaluation of the effectiveness, the object region extraction system 500 can extract an object region in three-dimensional space robustly in terms of a lack of back projection. That is, in its extracting an object region in three-dimensional space by the use of back projections of object region images extracted from a plurality of camera images, the object region extraction system 500 does not perform the object region extraction under a severe restrictive condition such that a region where all of the back projections overlap each other is determined to be an object region in three-dimensional space. Instead, the object region extraction system 500 extracts an object region in three-dimensional space by evaluating largeness of the number of cameras from which back projections are obtained, which is defined as a ratio of the number of cameras for which back projections are obtained, L(x,y,z), to the number of cameras for which visual fields are obtained, M(x,y,z), and is robust in terms of a lack of back projection. As a result, non-extraction of an object region in three-dimensional space arising from mis-extraction of an object region from camera images can be improved, and accordingly the robustness can be increased in terms of a lack of back projection.

<Second Exemplary Embodiment>

Next, a second exemplary embodiment of the present invention will be described in detail with reference to drawings.

Figure 15:
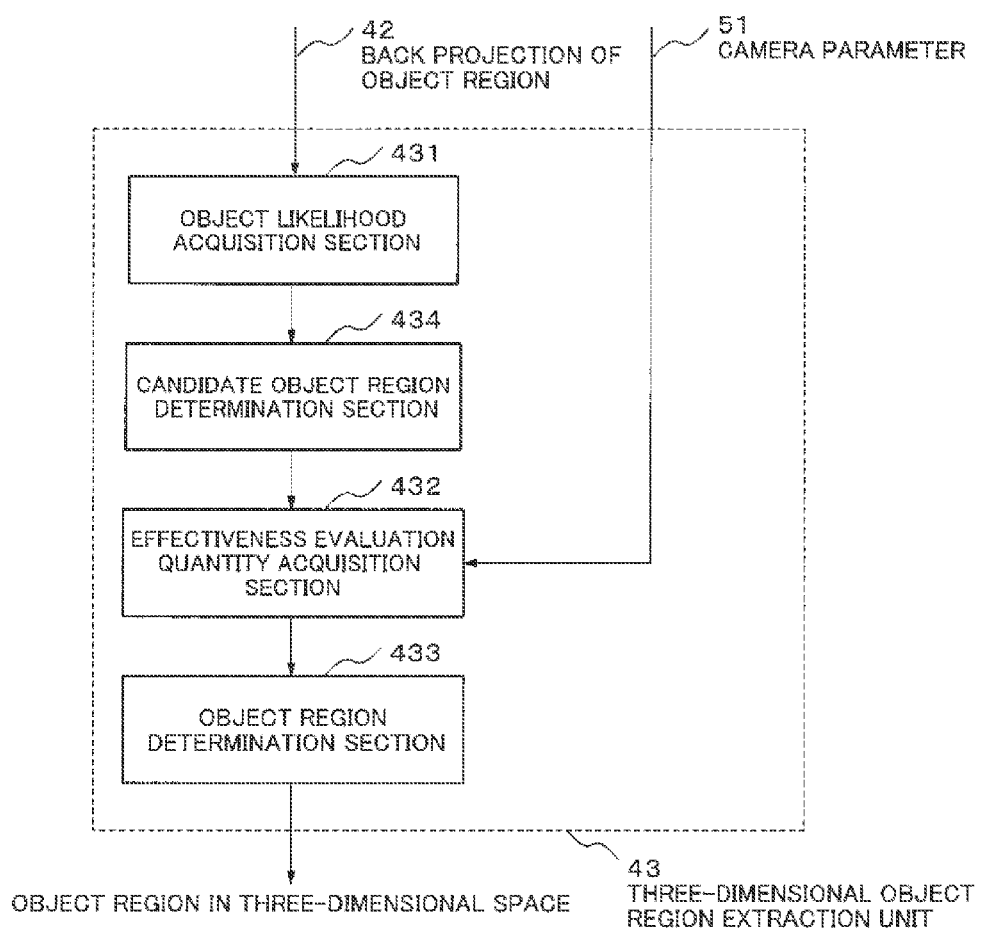
[FIG. 15] a block diagram showing a configuration of a second exemplary embodiment of the present invention.

Referring to FIG. 15, an object region extraction system 500 according to the second exemplary embodiment of the present invention has a configuration where a candidate object region determination section 434 is added to the three-dimensional object region extraction unit 43 of the first exemplary embodiment shown in FIG. 6, and connections between the units are changed. Additionally, partial modifications are made as will be described below, with respect to the contents of the effectiveness evaluation quantity acquisition section 432 and the object region determination section 433. The contents of the candidate object region determination section 434, the effectiveness evaluation quantity acquisition section 432 and the object region determination section 433 in the present exemplary embodiment are as follows.

Using the object likelihood r1(x,y,z) obtained at the object likelihood acquisition unit 431, the candidate object region determination section 434 determines whether a three-dimensional space (x,y,z) is a candidate object region, and thus extracts a candidate object region in three-dimensional space. The determination method is, for example, a method where a three-dimensional space is extracted as a candidate object region if the object likelihood r1 is equal to or larger than a threshold value. By this processing, the range of object regions possibly to be extracted by the object region determination section 433 can be narrowed.

The processing performed by the effectiveness evaluation quantity acquisition section 432 and that by the object region determination section 433 are not done on the whole of a predetermined three-dimensional space, but done on the narrowed regions which are candidate object regions in three-dimensional space extracted by the candidate object region determination unit 434. This is a different point from the first exemplary embodiment.

Next, detail description will be given of operation of the second exemplary embodiment of the present invention, with reference to FIGS. 11, 16 and 17.

Figure 16:
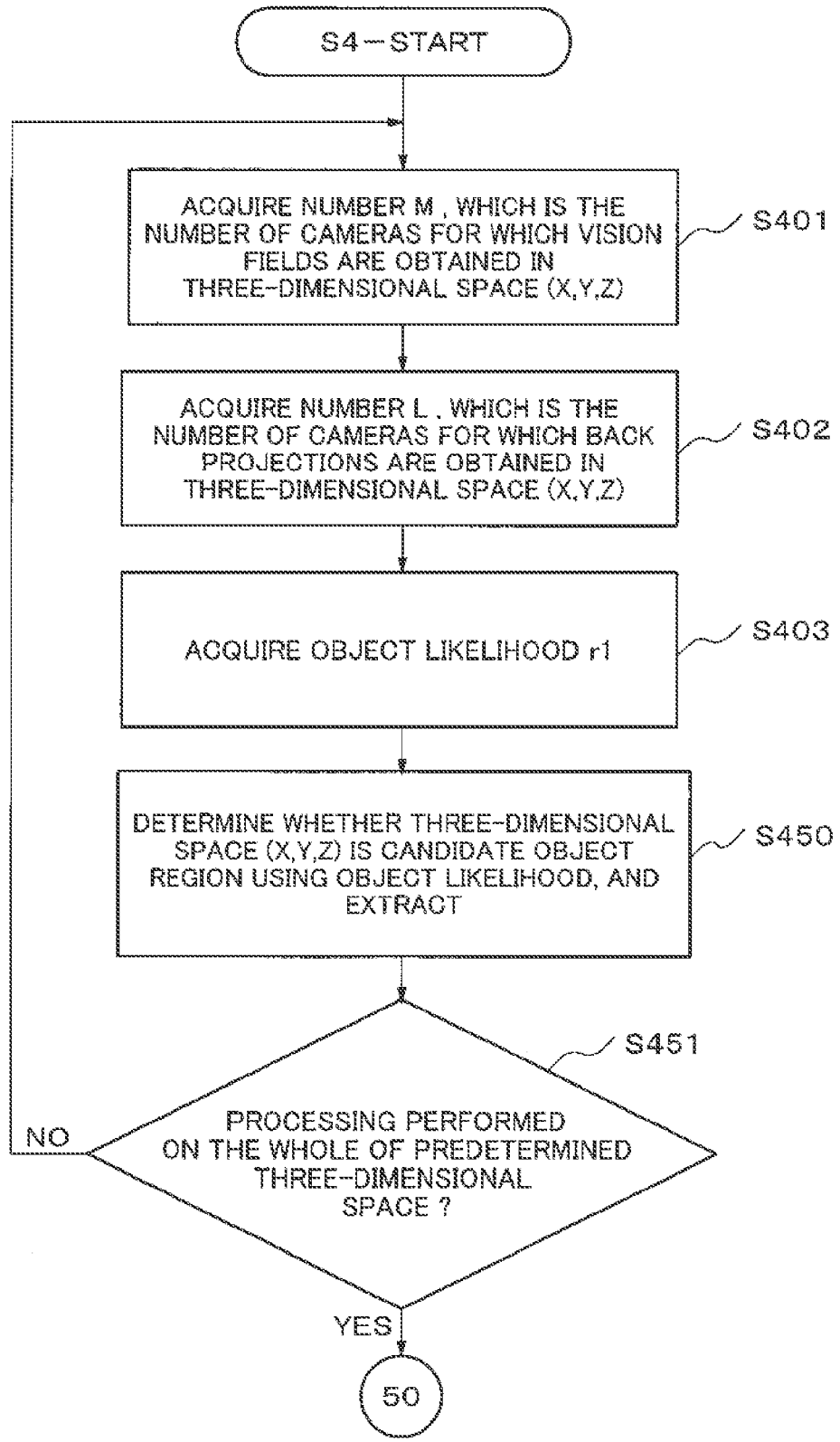
[FIG. 16] a flow chart showing operation of the second exemplary embodiment of the present invention.

Operation of the object region extraction system 500 according to the second exemplary embodiment of the present invention is one obtained by omitting the operation of Step S404 from, and adding the operations of Step S450 and Step S451 shown in FIG. 16 to, the operation of the object region extraction system 500 according to the first exemplary embodiment of the present invention shown in FIG. 12. Additionally, the operation of the object region extraction system 500 according to the second exemplary embodiment of the present invention is one obtained by further omitting the operations of Steps S407 and S409 from, and further adding the operation of Step S452 shown in FIG. 17 to, the operation of the object region extraction system 500 according to the first exemplary embodiment of the present invention shown in FIGS. 13 and 14. The other steps are the same as that in the operation of the object region extraction system 500 according to the first exemplary embodiment, and accordingly their descriptions are omitted.

First, the operations of Steps S450 and S451 shown in FIG. 16 are as follows. The candidate object region determination section 434 determines whether a target three-dimensional space (x,y,z) is a candidate object region, using the object likelihood r1(x,y,z) obtained at the object likelihood acquisition section 431. The candidate object region determination section 434 extracts a three-dimensional space (x,y,z) whose object likelihood r1(x,y,z) is equal to or larger than a threshold value as a candidate object region in three-dimensional space (Step S450 in FIG. 16). When the process of Step S450 is completed, the object region extraction system 500 determines if the processes of Steps S401, S402, S403 and S450 have been performed on the whole of the predetermined three-dimensional space (Step S451 in FIG. 16), and repeats the processes of Steps S401, S402, S403 and S450 until they are completely performed on the whole of the predetermined three-dimensional space (No at Step S451 in FIG. 16). If the processes are completed on the whole of the predetermined three-dimensional space (Yes at Step S451 in FIG. 16), the object region extraction system 500 carries out Steps S405, S406 and S408 in FIG. 17. Because the operations of these steps are the same as that in the first exemplary embodiment, their descriptions are omitted here.

Figure 17:
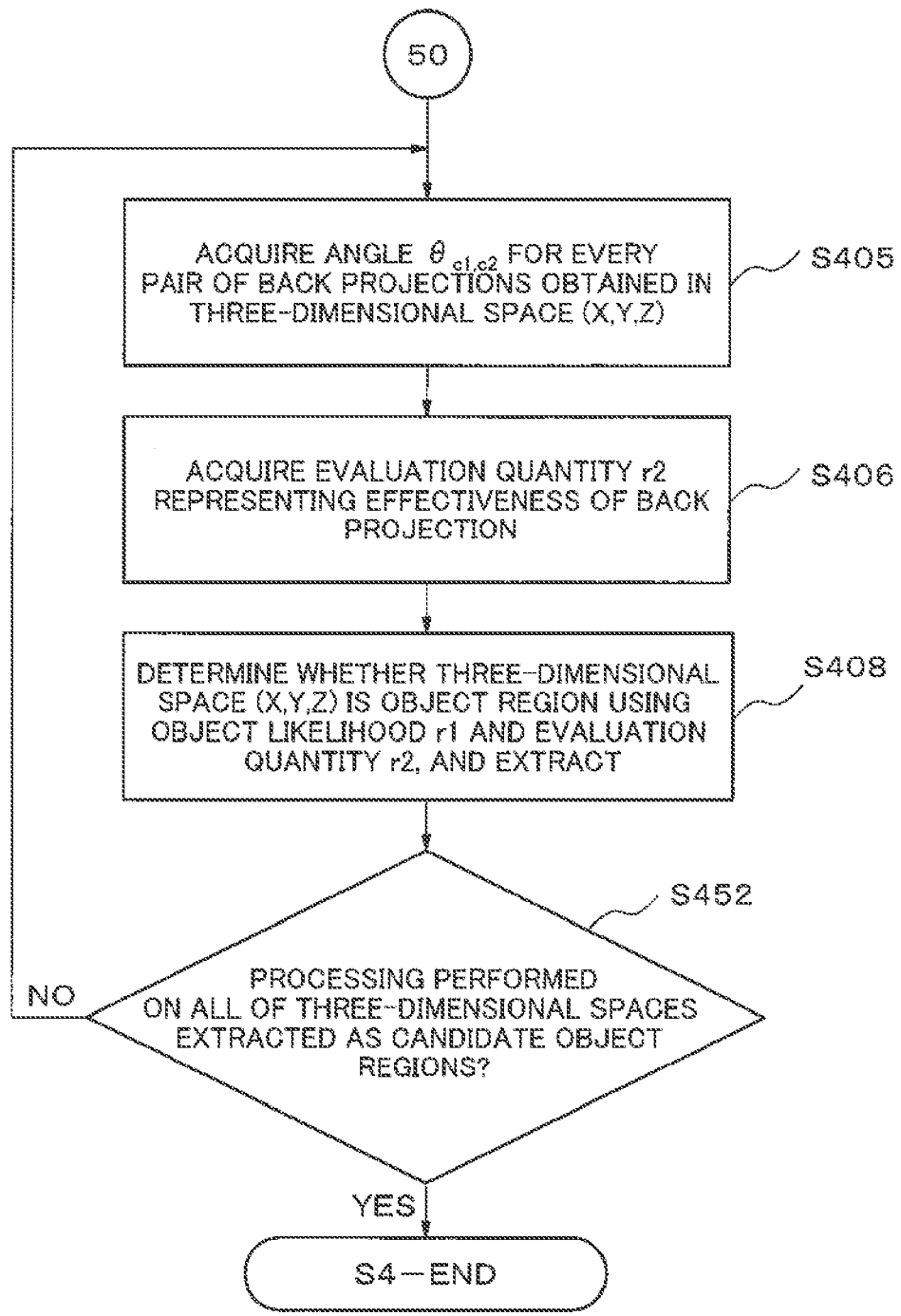
[FIG. 17] a flow chart showing operation of the second exemplary embodiment of the present invention.

Next, the operation of Step S452 shown in FIG. 17 is as follows. When the process of Step S408 is completed, the object region extraction system 500 repeats the processes of Steps S405, 406 and 408 until these processes are completely performed on all of the three-dimensional spaces of the candidate object regions extracted by the candidate object region determination unit 434 (No at Step S452 in FIG. 17). When the processes are completed on all of the three-dimensional spaces of the extracted candidate object regions (Yes at Step S452), the object region extraction system 500 ends the processes of Step S4.

Next, an advantageous effect of the second exemplary embodiment of the present invention will be described. The object region extraction system 500 according to the present exemplary embodiment carries out the narrowing of object regions where a three-dimensional space (x,y,z) whose object likelihood r1(x,y,z) is equal to or larger than a threshold value is extracted as a candidate object region in three-dimensional space, and subsequently performs the object region extraction on the narrowed candidate object regions. As a result, the object region extraction system 500 can reduce the amount of calculation of the evaluation quantity r2 representing the effectiveness of back projections, and accordingly can perform the object region extraction in three-dimensional space at high speed.

<Third Exemplary Embodiment>

Next, a third exemplary embodiment of the present invention will be described in detail, with reference to a drawing.

Figure 18:
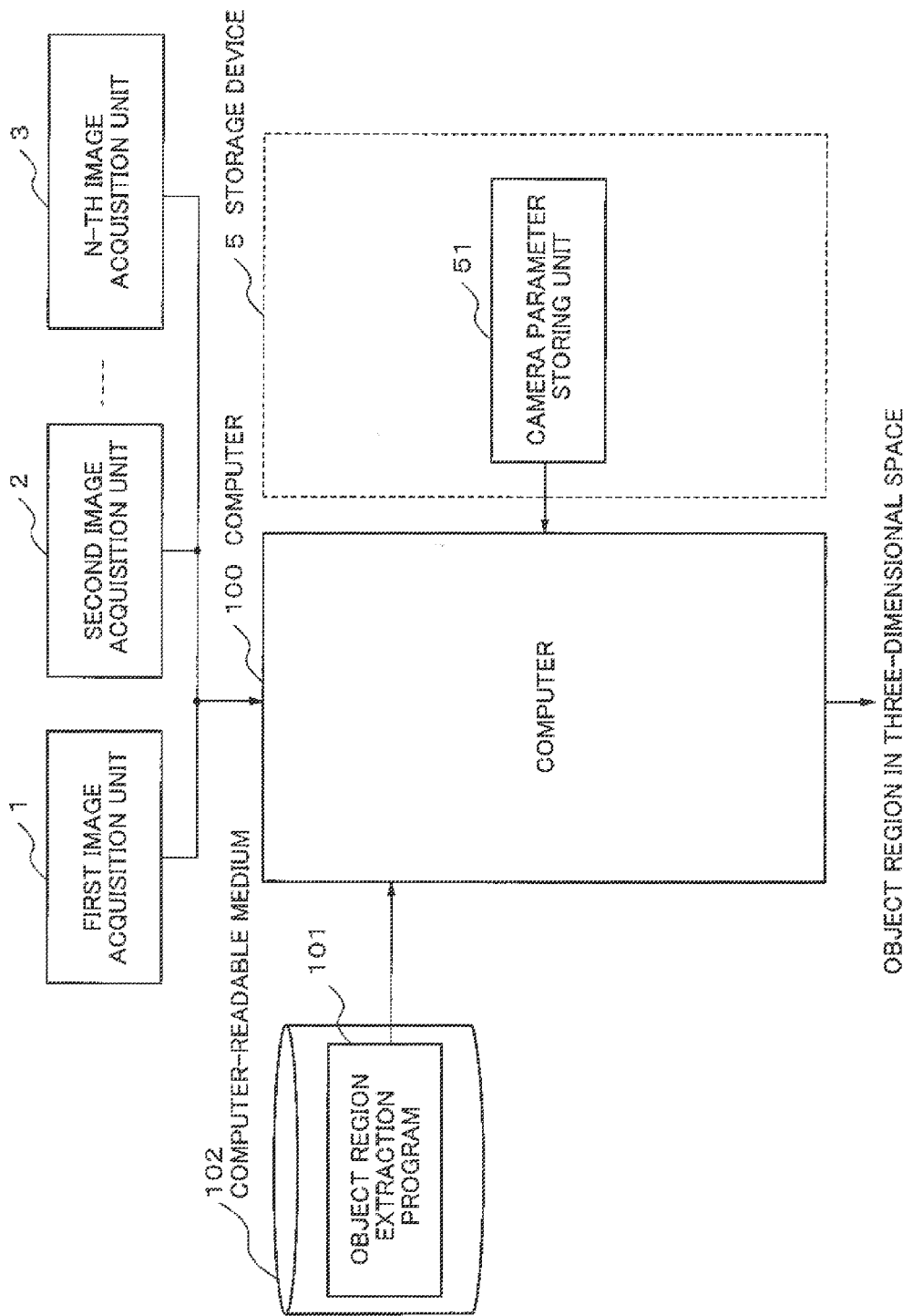
[FIG. 18] a block diagram showing a configuration of a third exemplary embodiment of the present invention.

FIG. 18 is a diagram showing the third exemplary embodiment of the present invention. Referring to FIG. 18, in the third exemplary embodiment of the present invention, a computer-readable recording medium 102 storing an object region extraction program 101 is connected to a computer 100. Further, a first image acquisition unit 1 to an n-th image acquisition unit 3 similar to that in the first exemplary embodiment and a storage device 5 comprising a camera parameter storing unit 51 are connected to the computer 100.

The computer-readable recording medium 102 is composed of a magnetic disk, a semiconductor memory or the like. The object region extraction program 101 stored in the computer-readable recording medium 102 is read into the computer 100 at start up or the like of the computer 100, and it controls operation of the computer 100. Accordingly, the object region extraction program 101 causes the computer 100 to function as the units 41 to 43 and sections 431 to 433 in the data processing device 4 in the first exemplary embodiment described above, and thus to perform the processes shown in FIGS. 11 to 14.

While the object region extraction system 500 according to the first exemplary embodiment is realized by a computer and a program in the above description, also the object region extraction system 500 according to the second exemplary embodiment can be realized by a computer and a program.

Further, when the object region determination section 433 selects an extraction method where a three-dimensional space (x,y,z) is extracted as an object region if its object likelihood r1 and evaluation quantity r2 are both equal to or larger than respective threshold values, the effectiveness evaluation quantity acquisition section 432 does not need to calculate angles for all pairs of back projections. That is, sequentially calculating angles for the pairs of back projections and thus sequentially calculating the evaluation quantity r2(x,y,z) representing the effectiveness of back projections by the equation (2), the effectiveness evaluation quantity acquisition section 432 may halt the calculation of the evaluation quantity r2(x,y,z) when a value of the evaluation quantity r2(x,y,z) is calculated to be equal to or larger than the threshold value described above, and acquire the value at that time. By this way, the effectiveness evaluation quantity acquisition section 432 can reduce the amount of calculation of the evaluation quantity r2(x,y,z), and accordingly can carry out the calculation at high speed. Further, also when the object region determination section 433 selects a method other than that described above, the evaluation quantity acquisition section 432 can set a threshold value and perform processing such as described above.

<Fourth Exemplary Embodiment>

Figure 19:
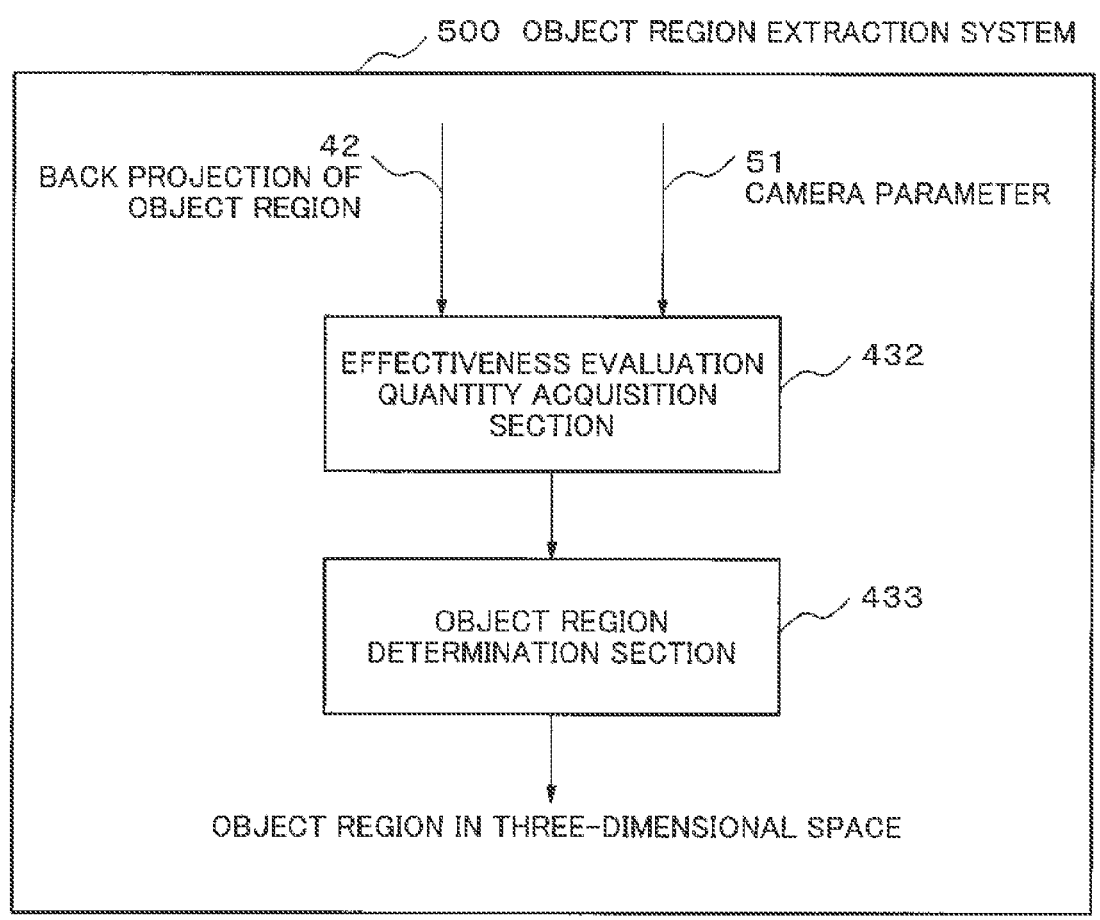
[FIG. 19] a block diagram showing a configuration of a fourth exemplary embodiment of the present invention.

Referring to FIG. 19, an object region extraction system 500 comprises the effectiveness evaluation quantity acquisition section 432 and the object region determination section 433. The other configurations are approximately similar to that in the first exemplary embodiment, and therefore their descriptions are omitted. With this configuration, realized is an object region extraction system which comprises: an effectiveness evaluation quantity acquisition means for acquiring an evaluation quantity which increases (or decreases) with the coming closer to a right angle of an angle made by two back projections selected from back projections of one point of an object, wherein said back projections are crossing each other at a position in three-dimensional space and obtained from respective images, which are including said one point and captured by respective ones of m-number of image acquisition means; and an object region determination means which, when the aforementioned evaluation quantity is equal to or larger than (equal to or smaller than) a predetermined value, determines the aforementioned position to be a region occupied by the aforementioned object, and outputs the aforementioned determination result.

According to the object region extraction system 500 according to the present exemplary embodiment, it is possible to improve non-extraction of an object region in three-dimensional space arising from mis-extraction of an object region from a camera image, and also to reduce incorrect extraction of an object region in three-dimensional space.

(Other Expressions of the Exemplary Embodiments)

A part or the whole of the exemplary embodiments described above can also be described as follows (but they are not limited to the followings).

(Supplementary Notes)

An object region extraction system characterized by that it comprises: an effectiveness evaluation quantity acquisition means which, using back projections of an object region from a plurality of image acquisition means, evaluates the effectiveness of the back projections in terms of object position identification by rectangularity of angles made by respective pairs of the back projections with respect to a position in three-dimensional space, and acquires the rectangularity as an evaluation quantity (index); and an object region determination means which determines and extracts an object region using the index acquired with respect to a position in three-dimensional space.

An object region extraction system characterized by that it further comprises, in addition to the above-described system, an object likelihood acquisition means which, using the back projections of an object region described above, acquires as an object likelihood (index) the largeness of the number of image acquisition means for which back projections are obtained with respect to a position in three-dimensional space being a target of object position estimation.

The object region extraction system characterized by that the aforementioned object likelihood acquisition means further acquires, as an object likelihood with respect to a position in three-dimensional space, an output value of a monotonously increasing function which takes as input a ratio of the number of image acquisition means for which back projections are obtained to the number of image acquisition means for which visual fields are obtained.

The object region extraction system described above which is characterized by that the aforementioned object likelihood acquisition means acquires, as an object likelihood with respect to a position in three-dimensional space, an output value of a function which increases as the number of image acquisition means for which back projections are obtained comes closer or equal to the number of image acquisition means for which visual fields are obtained.

The object region extraction system described above which is characterized by that, using the back projections with respect to a position in three-dimensional space obtained from the image acquisition means, the aforementioned object likelihood acquisition means extracts all pairs of the back projections and calculates an angle for each of the pairs of back projections (an angle determined by the positions of two image acquisition means and a position in three-dimensional space), and using a function which increases as the angle becomes more rectangular, the object likelihood acquisition means calculates an output value of the function for each of the pairs, and acquires the highest output value as an evaluation quantity.

The object region extraction system described above which is characterized by that, using the back projections with respect to a position in three-dimensional space obtained from the image acquisition means, the aforementioned object likelihood acquisition means sequentially extracts pairs of the back projections and calculates an angle for a newly extracted pair of back projections (an angle determined by the positions of the two image acquisition means and a position in three-dimensional space), and using a function which increases as the angle becomes more rectangular, the object likelihood acquisition means halts the sequential processing when an output value of the function equal to or larger than a threshold value is obtained, and acquires the output value as an evaluation quantity.

The object region extraction system described above which is characterized by that a position in three-dimensional space whose object likelihood is equal to or larger than a threshold value is extracted at the aforementioned object likelihood acquisition means, and the processing by the aforementioned effectiveness evaluation quantity acquisition means and that by the aforementioned object region determination means are performed only on the position, and thereby an object region is extracted.

The object region extraction system described above which is characterized by that when the aforementioned object likelihood is equal to or larger than a threshold value and also the aforementioned evaluation quantity is equal to or larger than a threshold value, the aforementioned object region determination means determines and extracts a corresponding position in three-dimensional space as an object region.

The object region extraction system described above which is characterized by that the aforementioned object region determination means calculates a posterior probability of object/non-object from the aforementioned object likelihood and the aforementioned evaluation quantity, and performs object region determination and extraction by comparing the posterior probability.

The object region extraction system described above which is characterized by that the aforementioned object region determination means applies weighting by a monotonously increasing function to the aforementioned object likelihood and the aforementioned evaluation quantity, acquires their maximum values, and determines and extracts a position in three-dimensional space as an object region when the maximum values are each equal to or larger than respective threshold values.

The object region extraction system described above which is characterized by that, using a classifier which receives an object likelihood and an evaluation quantity as input and thus outputs a category of object (=1)/non-object (=0), the aforementioned object region determination means determines and extracts a position in three-dimensional space as an object region when an output value obtained by inputting the aforementioned object likelihood and the aforementioned evaluation quantity to the classifier is equal to or larger than a threshold value.

An object region extraction program and an object region extraction method corresponding to the above descriptions.

Although the present invention has been described above with reference to the exemplary embodiments, the present invention is not limited to the above-described exemplary embodiments. Various changes which are understood by those skilled in the art can be made in configurations and details of the present invention, within the scope of the present invention.

According to the present invention, possible is adaptation to uses such as an object region extraction system capable of extracting an object region, which is effective for object position identification, a program causing a computer to realize the object region extraction system, and a method thereof. Also possible is adaptation to uses in the surveillance field requiring object region extraction from images stored in a camera, such as detection of an intruder, a suspicious individual, an abandoned suspicious item, making away with a baggage, tailgating, congestion and a line. Also possible is contribution to uses in the marketing field such as flow analysis and behavior analysis. Further possible is application to uses such as an input interface taking as input an object region and an object position from an image stored in a camera. Additionally possible is application to uses such as video and image search using an object region and an object position as a trigger key.

The present invention is not limited to the above-described exemplary embodiments. Various changes which are understood by those skilled in the art can be made in configurations and details of the present invention, within the scope of the present invention.

This application insists on priority based on Japanese Patent Application No. 2010-142205 proposed on Jun. 23, 2010, and takes everything of the disclosure here.

REFERENCE SIGNS LIST

1 first image acquisition unit
2 second image acquisition unit
3 n-th image acquisition unit
4 data processing device
5 storage device
41 two-dimensional object region extraction unit
42 back projection unit
43 three-dimensional object region extraction unit
51 camera parameter storing unit
100 computer
101 object region extraction program
102 computer-readable recording medium
431 object likelihood acquisition section
432 effectiveness evaluation quantity acquisition section
433 object region determination section
434 candidate object region determination section
500 object region extraction system

The invention claimed is:

1. An object region extraction system comprising:
an effectiveness evaluation quantity acquisition unit for acquiring an evaluation quantity which increases (or decreases) with coming closer to right angle of an angle made by two back projections selected from back projections of one point of an object, wherein said back projections are crossing each other at a position in three-dimensional space and obtained from respective images, which are including said one point and captured by respective ones of m-number of image acquisition units (m: a plural number);
an object region determination unit which, when said evaluation quantity is equal to or larger than (or, equal to or smaller than) a predetermined value, determining said position to be a region occupied by said object, and outputting said determination result; and
an object likelihood acquisition unit for selecting said m-number of image acquisition units each of which captured an image enabling back projection of said one point, from n-number of image acquisition units (n: equal to or larger than said number m) capable of capturing said position, and calculates a ratio of said number m to said number n as an object likelihood; wherein
said object region determination unit for determining said position to be a region occupied by said object if each of said evaluation quantity and said object likelihood is equal to or larger than a respective predetermined value or both of them are equal to or larger than said predetermined values.

2. The object region extraction system according to claim 1, wherein said effectiveness evaluation quantity acquisition units calculates said evaluation quantity using said angle closest to right angle among said angles made by every pair of said back projections taken from said m-number of back projections.

3. The object region extraction system according to claim 2, wherein said effectiveness evaluation quantity acquisition unit calculates said evaluation quantity for said position only if the object likelihood for said position is equal to or larger than a predetermined value.

4. The object region extraction system according to claim 3, wherein, said object region determination unit calculates a posterior probability of said object's existence at said position and that of said object's non-existence at said position are calculated from said object likelihood and said evaluation quantity for said position, and also from a prior probability of said object's existence at said position and that of said object's non-existence at said position, which are determined in advance with respect to said position, and then compares both of the posterior probabilities, and then determines whether or not said position is a region occupied by said object is determined.

5. A non-transitory storage medium storing an object region extraction program which causes a computer to execute:
an effectiveness evaluation quantity acquisition step of acquiring an evaluation quantity which increases (or decreases) with the coming closer to aright angle of an angle made by two back projections selected from back projections of one point of an object, wherein said back projections are crossing each other at a position in three-dimensional space and obtained from respective images, which are including said one point and captured by respective ones of m-number of image acquisition units (m: a plural number);
an object region determination step of, when said evaluation quantity is equal to or larger than (or, equal to or smaller than) a predetermined value, determining said position to be a region occupied by said object, and outputting said determination result;
an object likelihood acquisition step of selecting said m-number of image acquisition units each of which captured an image enabling back projection of said one point, from among n-number of image acquisition units (n: equal to or larger than said number m) capable of capturing said position, and calculating a ratio of said number m to said number n as an object likelihood; and said object region determination step of determining said position to be a region occupied by said object if each of said evaluation quantity and said object likelihood is equal to or larger than respective predetermined values or both of them are equal to or larger than said predetermined values.

6. An object region extraction method comprising:

acquiring an evaluation quantity which increases (or decreases) with the coming closer to a right angle of an angle made by two back projections selected from back projections of one point of an object, wherein said back projections are crossing each other at a position in three-dimensional space and obtained from respective images, which are including said one point and captured by respective ones of m-number of image acquisition units (m: a plural number);

determining said position to be a region occupied by said object when said evaluation quantity is equal to or larger than (or, equal to or smaller than) a predetermined value, and outputting said determination result;

selecting said m-number of image acquisition units each of which captured an image enabling back projection of said one point, from among n-number of image acquisition units (n: equal to or larger than said number m) capable of capturing said position, and calculating a ratio of said number m to said number n as an object likelihood; and determining said position to be a region occupied by said object if each of said evaluation quantity and said object likelihood is equal to or larger than respective predetermined values or both of them are equal to or larger than said predetermined values.

7. An object region extraction system comprising:

an effectiveness evaluation quantity acquisition unit for acquiring an evaluation quantity which increases (or decreases) with coming closer to right angle of an angle made by two back projections selected from back projections of one point of an object, wherein said back projections are crossing each other at a position in three-dimensional space and obtained from respective images, which are including said one point and captured by respective ones of m-number of image acquisition units (m: a plural number);

an object region determination unit for, when said evaluation quantity is equal to or larger than (or, equal to or smaller than) a predetermined value, determining said position to be a region occupied by said object, and outputting said determination result; and an object likelihood acquisition unit for selecting said m-number of image acquisition units each of which captured an image enabling back projection of said one point, from n-number of image acquisition units (n: equal to or larger than said number m) capable of capturing said position, and calculates a ratio of said number m to said number n as an object likelihood wherein said object region determination unit for determining said position to be a region occupied by said object if each of said evaluation quantity and said object likelihood is equal to or larger than a respective predetermined value or both of them are equal to or larger than said predetermined values.

* * * * *